(12) United States Patent
Okabe

(10) Patent No.: US 11,377,103 B2
(45) Date of Patent: Jul. 5, 2022

(54) VEHICLE CONTROL DEVICE AND RECORDING MEDIUM

(71) Applicant: PANASONIC INTELLECTUAL PROPERTY MANAGEMENT CO., LTD., Osaka (JP)

(72) Inventor: Yoshimasa Okabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 281 days.

(21) Appl. No.: 16/351,164

(22) Filed: Mar. 12, 2019

(65) Prior Publication Data

US 2019/0283747 A1    Sep. 19, 2019

(30) Foreign Application Priority Data

Mar. 13, 2018  (JP) .............................. JP2018-045158

(51) Int. Cl.
*B60W 30/10*  (2006.01)

(52) U.S. Cl.
CPC ......... *B60W 30/10* (2013.01); *B60W 2420/42* (2013.01); *B60W 2554/4041* (2020.02)

(58) Field of Classification Search
CPC ............. B60W 30/10; B60W 2420/42; B60W 2554/4041; B60W 30/18163; B60W 2554/4045
See application file for complete search history.

(56) References Cited

U.S. PATENT DOCUMENTS

| | | | | |
|---|---|---|---|---|
| 7,809,506 B2 * | 10/2010 | Kuge | ..................... | B62D 6/007 |
| | | | | 701/301 |
| 9,142,131 B2 * | 9/2015 | Hayakawa | ......... | B62D 15/0265 |
| 9,852,635 B2 | 12/2017 | Fukuda et al. | | |
| 9,988,047 B2 * | 6/2018 | Johnson | ................. | G08G 1/166 |
| 10,319,226 B2 * | 6/2019 | Tachibana | .............. | G08G 1/163 |
| 10,414,398 B2 | 9/2019 | Ochi | | |

(Continued)

FOREIGN PATENT DOCUMENTS

| | | |
|---|---|---|
| CN | 106794840 A | 5/2017 |
| DE | 112014005398 | 8/2016 |

(Continued)

OTHER PUBLICATIONS

Official Action dated Aug. 17, 2021, which was issued in Japanese Patent Application No. 2018-045158 along with corresponding English translation.

(Continued)

*Primary Examiner* — Ig T An
(74) *Attorney, Agent, or Firm* — Greenblum & Bernstein, P.L.C.

(57) ABSTRACT

A host vehicle includes a rear image capturing device and a vehicle control device. The rear image capturing device captures an image of an area behind the host vehicle. The vehicle control device detects a lateral position of a following vehicle in the same lane as that in which the host vehicle travels, the following vehicle being reflected in the image captured by the rear image capturing device and traveling in the lane. The vehicle control device determines a lateral position of the host vehicle within a lane depending on the lateral position of the following vehicle within the same lane.

17 Claims, 15 Drawing Sheets

(56) References Cited

U.S. PATENT DOCUMENTS

| | | | |
|---|---|---|---|
| 10,775,799 B2 * | 9/2020 | Sim | G05D 1/0214 |
| 10,878,702 B2 | 12/2020 | Fukuda et al. | |
| 2016/0300491 A1 | 10/2016 | Fukuda et al. | |
| 2017/0327117 A1 | 11/2017 | Ochi | |
| 2018/0174467 A1 | 6/2018 | Fukuda et al. | |

FOREIGN PATENT DOCUMENTS

| | | |
|---|---|---|
| JP | 2004-220348 | 8/2004 |
| JP | 2013-097714 | 5/2013 |
| JP | 2014-180986 | 9/2014 |
| JP | 2017-030396 | 2/2017 |
| WO | 2016024316 A1 | 2/2016 |
| WO | 2016088462 A1 | 6/2016 |
| WO | 2016208500 A1 | 12/2016 |

OTHER PUBLICATIONS

Chinese Office Action dated Dec. 27, 2021 issued in Chinese patent application No. 201910187926.9 and corresponding English translation.

Office Action dated Mar. 14, 2022 issued in German Patent Application No. 102019106375.2 and corresponding English translation.

* cited by examiner

VEHICLE CONTROL DEVICE AND RECORDING MEDIUM

BACKGROUND

1. Field

The present disclosure relates to a data processing technology, and more particularly, to a technology of controlling a vehicle.

2. Description of the Related Art

There is a need to check a situation of the periphery of a vehicle for safe driving of the vehicle, and in some cases, a rear sensor sensing a state of a space behind the vehicle is mounted in the vehicle. In some cases, when a sensing range of a rear sensor is blocked by an object behind a vehicle, a control of displacing a lateral position of a host vehicle in order to decrease the blocked range is performed.

Patent Literature 1: Jpn. Pat. Appln. KOKAI Publication No. 2014-180986

In some cases such as traffic congestion, a two-wheeled vehicle runs through between slowing down vehicles and a lane dividing line (a centerline or the like). As described above, when the lateral position of the host vehicle is displaced, it is apprehended that the host vehicle comes into contact with a two-wheeled vehicle approaching by passing between a following vehicle and a lane dividing line.

SUMMARY

The present disclosure has been made in view of the above circumstances. An object of the present disclosure is to provide a technology of suitably controlling traveling of a vehicle.

In order to solve the above problems, according to one aspect of the present disclosure, a vehicle control device includes: a receiver structured to receive an image of a periphery of a host vehicle captured by an image capturing device; a detector structured to detect a lateral position of a following vehicle in the same lane as that in which the host vehicle travels, the following vehicle being reflected in the image acquired by the acquiring unit and traveling in the lane; and a decision circuitry structured to determine a lateral position of the host vehicle in the lane depending on the lateral position of the following vehicle detected by the detector.

It should be noted that an arbitrary combination of the constituent elements described above, and expressions of the present disclosure converted between a system, a method, a computer program, a recording medium in which a computer program is recorded, a vehicle mounted with the present device, and the like are also effective as aspects of the present disclosure.

DETAILED DESCRIPTION

The invention will now be described by reference to the preferred embodiments. This does not intend to limit the scope of the present invention, but to exemplify the invention.

Figure 1:
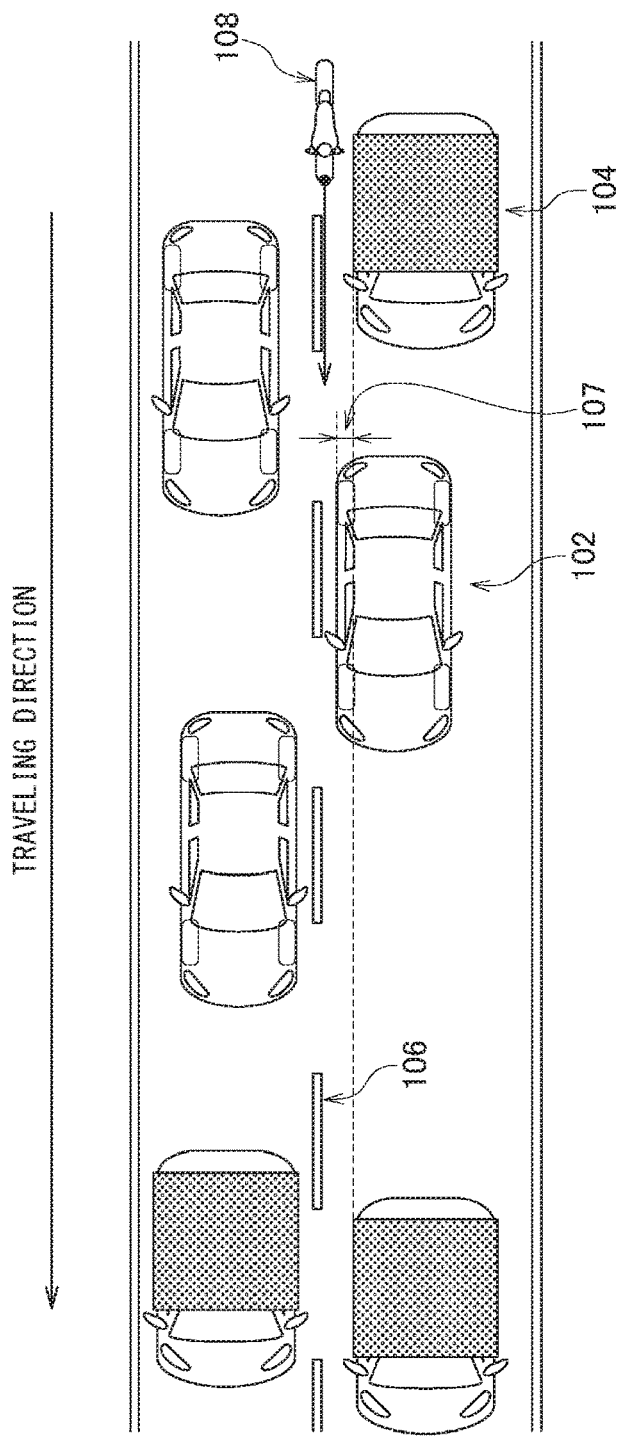
FIG. 1 is a diagram schematically illustrating a congested road.

FIG. 1 schematically illustrates a congested road. When a sensing range of a sensor or a camera sensing a state of a space behind a host vehicle 102 is blocked by a following vehicle 104, displacement of a lateral position of the host vehicle 102 for decreasing the range blocked by the following vehicle 104 can be considered. However, when the lateral position of the host vehicle 102 is displaced at the time of slowing down such as traffic congestion, there is a risk that a two-wheeled vehicle 108 runs through between the following vehicle 104 and a lane dividing line 106 and a vehicle body or a side mirror of the host vehicle 102 comes into contact with each other. Further, at this time, the larger the width (exposed width 107) at which the host vehicle 102 is exposed toward the lane dividing line 106 from the following vehicle 104 is, the larger the risk of coming into contact with the two-wheeled vehicle 108.

Therefore, when the following vehicle 104 traveling in the same lane as that of the host vehicle 102 is present, a vehicle control device according to the embodiment determines a lateral position of the host vehicle in the corresponding lane depending on a lateral position of the following vehicle 104 in the corresponding lane and causes the host vehicle 102 to move so as to reach the determined lateral position. As a result, it is possible to improve safety of the host vehicle 102 by actively using the following vehicle for shielding. That is, it is possible to reduce the risk that the two-wheeled vehicle 103 approaching from behind the following vehicle 101 and the host vehicle 102 come into contact with each other. Hereinafter, first to third embodiments will be described. One of these embodiments or an arbitrary combination thereof can be applied to the host vehicle 102.

First Embodiment

Figure 2:
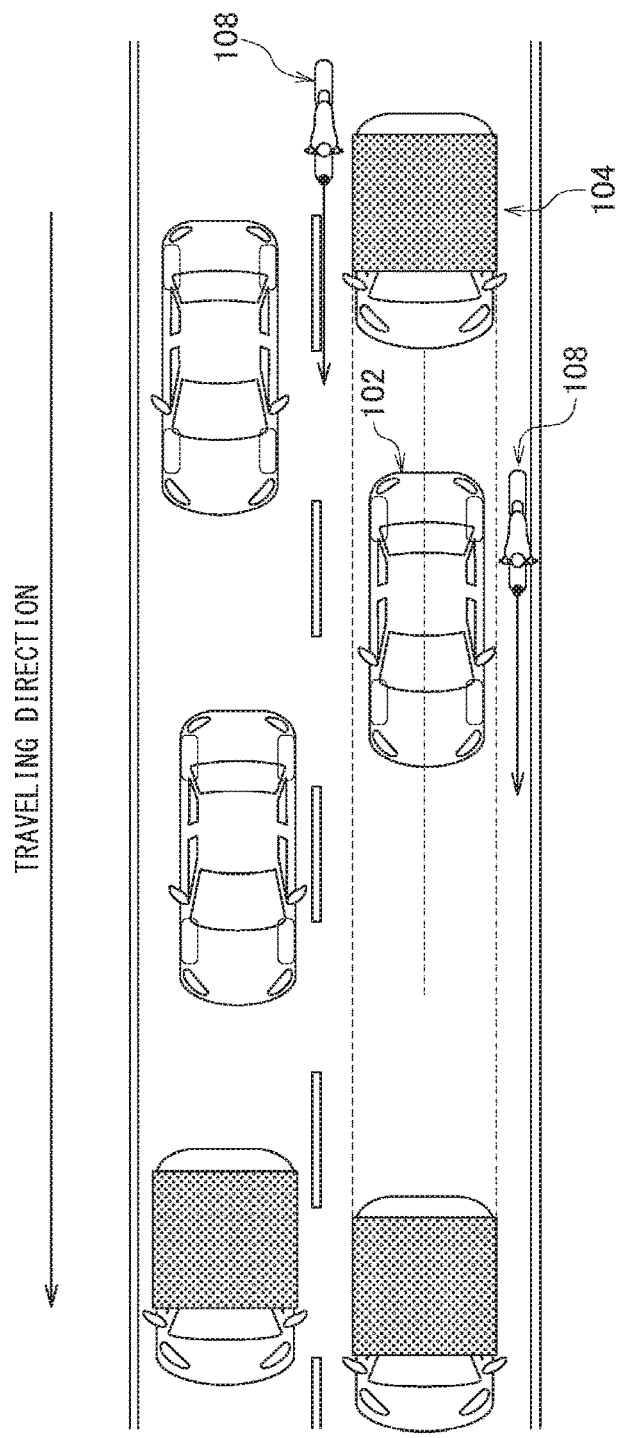
FIG. 2 is a diagram schematically illustrating a congested road.

FIG. 2 schematically illustrates a congested road. At the time of traffic congestion, a two-wheeled vehicle approaches from a hard shoulder (an outer edge line of a lane) in some cases. In this case, the vehicle control device according to a first embodiment controls a lateral position of a host vehicle 102 so that the host vehicle 102 is positioned right in front of a following vehicle. In other words, the vehicle control device controls the lateral position of the host vehicle 102 so that an exposed width of a side surface of the host vehicle 102 from a side surface of the following vehicle 104 becomes minimal. It should be noted that a lateral position in the present disclosure is a position in a lateral direction (also referred to as a left-right direction) perpendicular to a traveling direction of a vehicle (in other words, a direction in which a lane extends). Hereinafter, the lateral position will also be called an offset.

Figure 3:
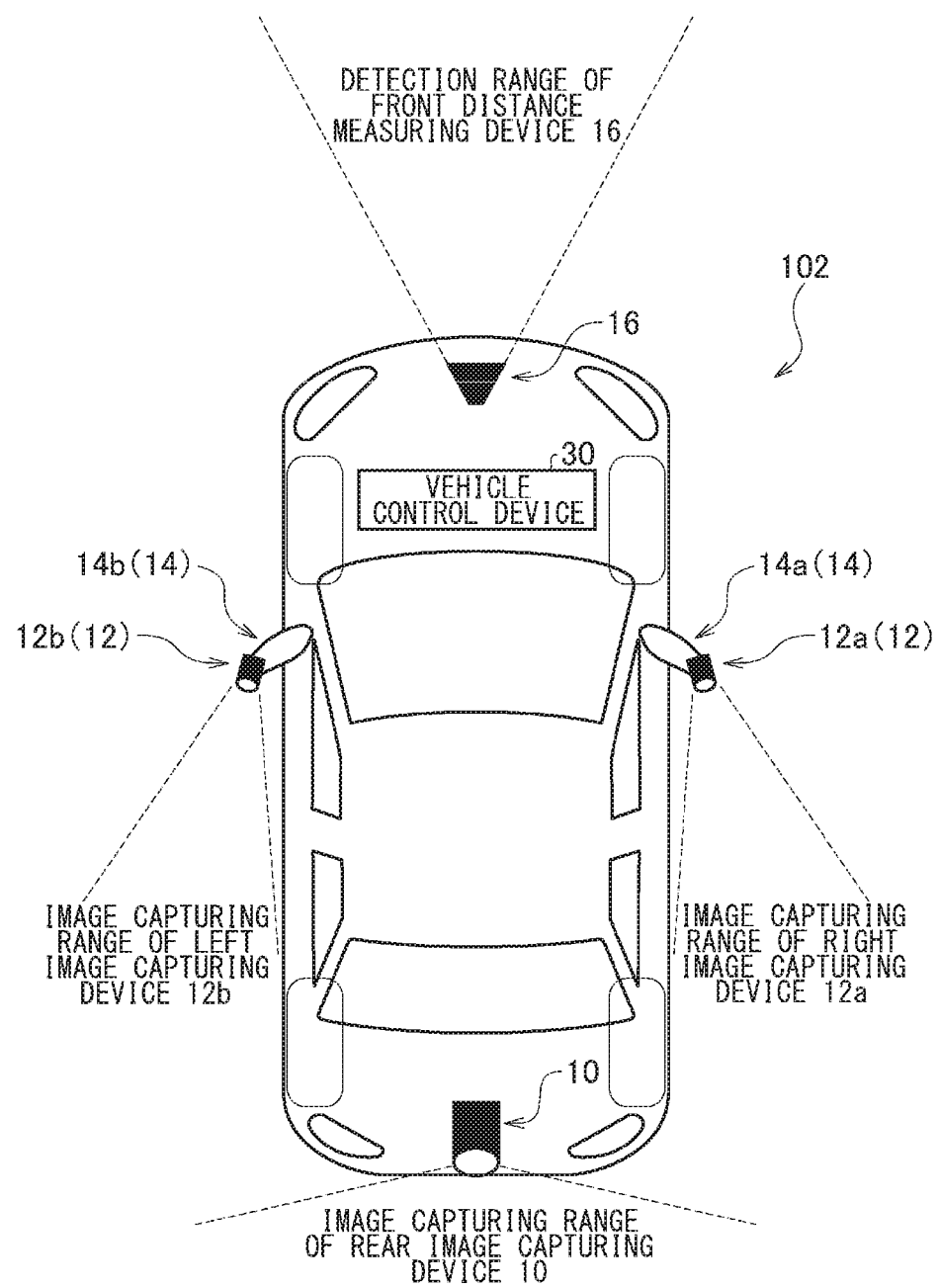
FIG. 3 is a diagram schematically illustrating a configuration of a vehicle according to a first embodiment.

FIG. 3 schematically illustrates a configuration of a vehicle (host vehicle 102) according to the first embodiment. The host vehicle 102 includes a rear image capturing device 10, a right image capturing device 12a and a left image capturing device 12b which are collectively called a side image capturing device 12, a right side mirror 14a and a left side mirror 14b which are collectively called a side mirror 14, a front distance measuring device 16, and a vehicle control device 30. The rear image capturing device 10 generates an image (hereinafter, also referred to as "rear image") obtained by capturing an image of a space behind the host vehicle 102 and outputs the generated image to the vehicle control device 30.

The right image capturing device 12a is installed on the right side mirror 14a, generates an image (hereinafter, also referred to as "right side image") obtained by capturing an image of the right side of the host vehicle 102 and an area of the right-rear side (that is, oblique right-rear side) of the host vehicle 102, and outputs the generated image to the vehicle control device 30. The left image capturing device 12b is added to the left side mirror 14b, generates an image (hereinafter, also referred to as "left side image") obtained by capturing an image of the left side of the host vehicle 102 and an area of the left-rear side (that is, oblique left-rear side) of the host vehicle 102, and outputs the generated image to the vehicle control device 30. The rear image capturing device 10, the right image capturing device 12a, and the left image capturing device 12b may be video cameras.

The front distance measuring device 16 is a sensor device which measures whether or not an object is present in front (within a predetermined distance from the host vehicle 102) of the host vehicle 102 and a distance to the object, and outputs data indicating a measurement result to the vehicle control device 30. The front distance measuring device 16 may also be a radar device or a lidar device. The vehicle control device 30 is also called an automatic driving controller, and controls a behavior of the host vehicle 102 based on data output from the rear image capturing device 10, the side image capturing device 12, and the front distance measuring device 16. The configuration of the host vehicle 102 in FIG. 3 is an example, and an image capturing device may also be provided at the front of a vehicle body of the host vehicle 102, or a sensor device such as a distance measuring device may also be provided at the rear of the vehicle body of the host vehicle 102.

Figure 4:
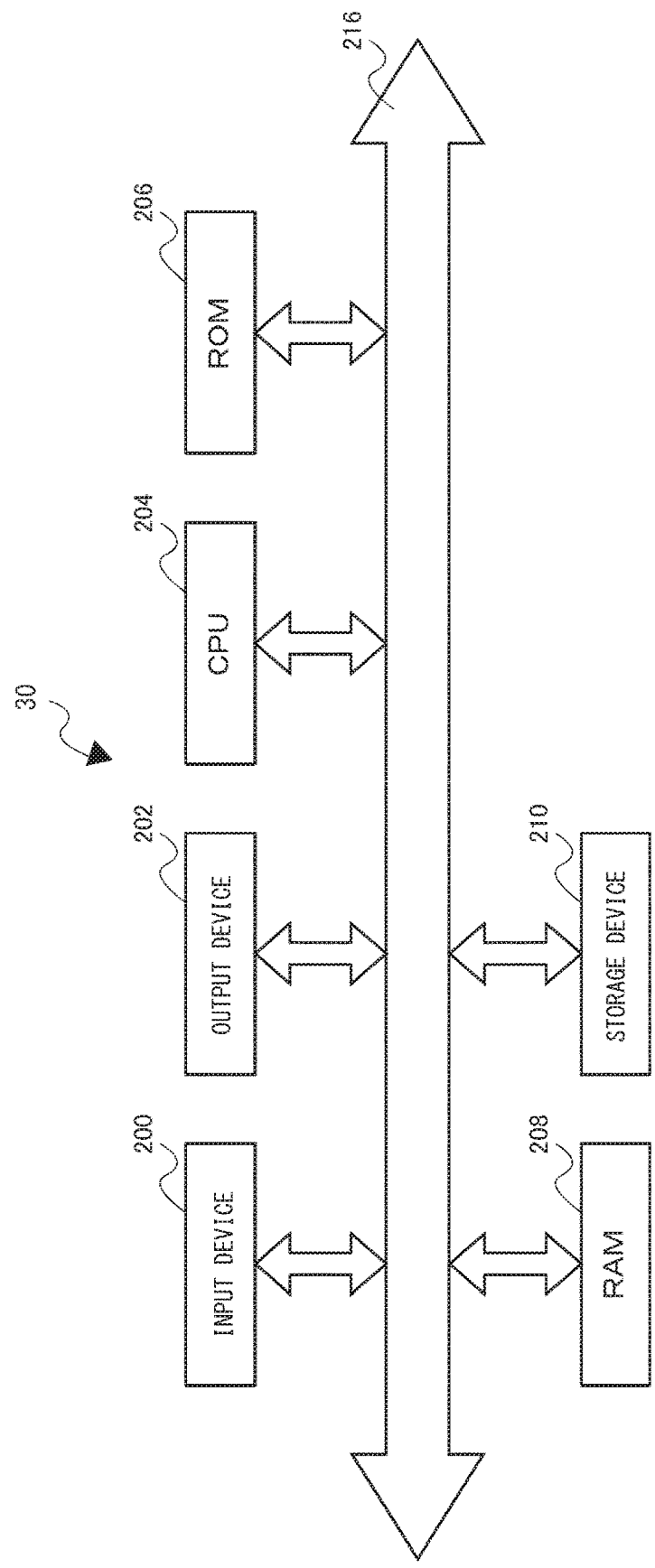
FIG. 4 is a diagram illustrating an example of a hardware configuration of a vehicle control device of FIG. 3.

The vehicle control device 30 may be mounted as an electronic control unit (ECU). FIG. 4 illustrates an example of a hardware configuration of the vehicle control device 30 of FIG. 3. The vehicle control device 30 includes an input device 200, an output device 202, a central processing unit (CPU) 204, a read only memory (ROM) 206, a random access memory (RAM) 208, and a storage device 210, which may be connected to one another through a bus 216. A computer program including a plurality of modules corresponding to a plurality of functional blocks (which will be described later with reference to FIG. 5) of the vehicle control device 30 may be installed in the ROM 206 or the storage device 210. The CPU 204 may perform functions of the respective functional blocks by reading the computer program to the RAM 208 and executing the computer program.

Figure 5:
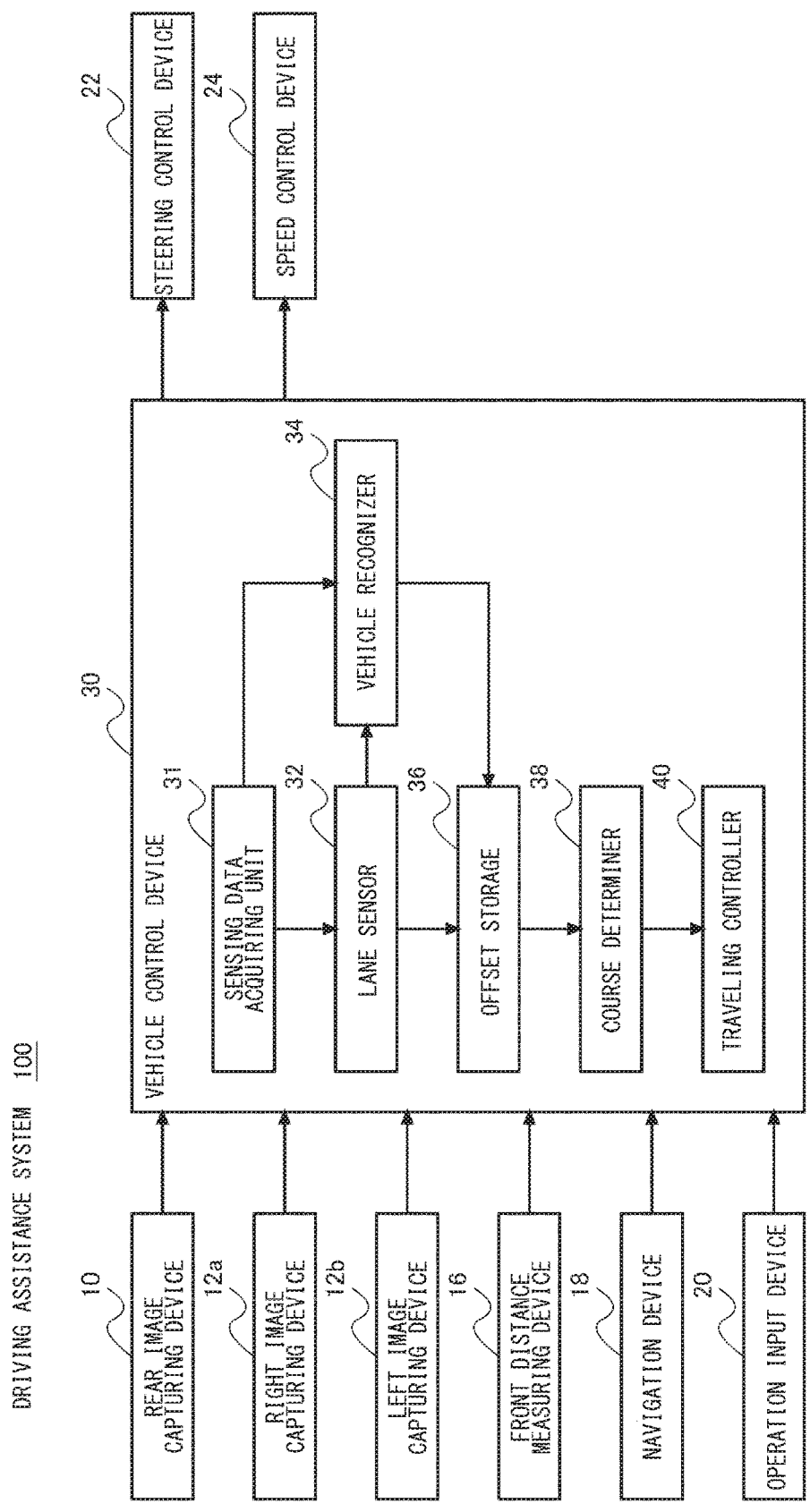
FIG. 5 is a block diagram illustrating functions of a driving assistance system according to the first embodiment.

The plurality of constituent elements of the host vehicle 102 illustrated in FIG. 3 cooperate with each other, thereby implementing a driving assistance system. FIG. 5 is a block diagram illustrating functions of a driving assistance system 100 according to the first embodiment. A driving assistance system 100 includes the rear image capturing device 10, the right image capturing device 12a, the left image capturing device 12b, the front distance measuring device 16, and the vehicle control device 30 which are illustrated in FIG. 3, and a navigation device 18, an operation input device 20, a steering control device 22, and a speed control device 24 which are not illustrated in FIG. 3. These devices may be connected to one another through a known vehicle-mounted network such as media oriented systems transport (MOST), a controller area network (CAN), a universal serial bus (USB), or the like.

Each block illustrated in the block diagram of the present disclosure can be implemented in an element such as a CPU and a memory of a computer, or mechanical equipment in terms of hardware, or can be implemented by a computer program or the like in terms of software. Here, functional blocks illustrated herein are implemented by a combination thereof. It is assumed that those skilled in the art understand that these functional blocks can be implemented in various forms by a combination of hardware and software.

The navigation device 18 communicates with a device outside the host vehicle 102, and grasps a current position, a planned traveling route, and a traffic situation (traffic congestion situation or the like) of the host vehicle 102. In addition, the navigation device 18 provides the vehicle control device 30 with information indicating whether or not traffic congestion occurs and branching information (for example, information indicating a lane change or a left turn and a right turn) of the planned traveling route of the host vehicle 102.

The operation input device 20 receives an operation input by an occupant (hereinafter, referred to as "driver") of the host vehicle 102 and notifies the vehicle control device 30 of contents of the operation. For example, the operation input device 20 receives selection of a lane maintaining mode by the driver and informs the vehicle control device 30 of the selection. The operation input device 20 may be integrated with the navigation device 18 or a display of the navigation device 18 may display a screen for inputting an operation.

The steering control device 22 is an actuator controlling steering of the host vehicle 102 according to an instruction of the vehicle control device 30. In addition, the steering control device 22 transmits information indicating a steering angle (or a turning angle) of the host vehicle 102 to the vehicle control device 30. The speed control device 24 is an actuator controlling a speed (acceleration) of the host vehicle 102 according to an instruction of the vehicle control device 30. In addition, the speed control device 24 transmits information indicating a speed of the host vehicle 102 to the vehicle control device 30.

The vehicle control device 30 includes a sensing data acquiring unit 31, a lane sensor 32, a vehicle recognizer 34, an offset storage 36, a course determiner 38, and a traveling controller 40. The sensing data acquiring unit 31 acquires an image or sensor data output from an external device. In detail, the sensing data acquiring unit 31 acquires a rear image output from the rear image capturing device 10, a right side image output from the right image capturing device 12a, a left side image output from the left image capturing device 12b, and measurement result data output from the front distance measuring device 16.

The lane sensor 32 senses a position of a lane dividing line in a peripheral space of the host vehicle 102 based on the rear image, the right side image, and the left side image acquired by the sensing data acquiring unit 31. The lane sensor 32 may sense a position of a lane dividing line by using a known image recognition technology or white line tracking technology.

The vehicle recognizer 34 detects a surrounding vehicle reflected in the rear image, the right side image, and the left side image which are acquired by the sensing data acquiring unit 31 based on these images. In the first embodiment, the vehicle recognizer 34 detects the following vehicle 104 traveling within the same lane as that of the host vehicle 102. The vehicle recognizer 34 may detect the following vehicle 104 by using a known image recognition technology or pattern matching.

The vehicle recognizer 34 detects a lateral position of the following vehicle 104 within a lane specified by the lane driving line sensed by the lane sensor 32, and a distance from the host vehicle 102 to the following vehicle 104. When the lateral position of the following vehicle 104 is the right edge of the lane (for example, the centerline), the lateral position of the following vehicle 104 may be expressed as 0%, when the lateral position of the following vehicle 104 is the left edge of the lane (for example, an outer edge line of the road), the lateral position of the following vehicle 104 may be expressed as 100%, and when the lateral position of the following vehicle 104 is the center of the lane, the lateral position of the following vehicle 104 may be expressed as 50%. For example, the vehicle recognizer 34 may detect that a position of a right side surface of the following vehicle 104 is 25% and a position of a left side surface of the following vehicle 104 is 75% as the lateral position of the following vehicle 104. In addition, the lateral position of the following vehicle 104 may include a position (50%, when the position of the right side surface is 25% and the position of the left side surface is 75%) of a central portion of a vehicle body of the following vehicle 104.

Further, the vehicle recognizer 34 recognizes a distance to a preceding vehicle based on measurement data of the front distance measuring device 16 acquired by the sensing data acquiring unit 31. When the distance to the preceding vehicle equal to or shorter than a predetermined threshold value (for example, three meters) becomes longer than the threshold value, the vehicle recognizer 34 determines that the preceding vehicle has moved, and informs the course determiner 38 of the determination.

The offset storage 36 stores offset data which are data indicating the lateral position of the following vehicle 104 within the lane detected by the vehicle recognizer 34.

The course determiner 38 determines a lateral position of the host vehicle 102 within the lane stored in the offset storage 36 depending on the lateral position of the following vehicle 104 within the same lane. In the first embodiment, the course determiner 38 plans a course of the host vehicle 102 to a target stop position so that the lateral position of the host vehicle 102 within a lane coincides with the lateral position of the following vehicle 104 within the same lane. The target stop position may be, for example, a position at a predetermined distance (for example, two meters) from a rear end of a vehicle (preceding vehicle) traveling right in front of the host vehicle 102 within the same lane as that of the host vehicle 102.

The traveling controller 40 controls a traveling aspect of the host vehicle 102 so that the host vehicle moves to the position determined by the course determiner 38. In detail, the traveling controller 40 controls the steering control device 22 and the speed control device 24 according to a course plan determined by the course determiner 38 to thereby causing the host vehicle 102 to move according to the course plan. A known technology may be adopted for a data form of the course plan or a method of controlling the steering control device 22 and the speed control device 24 by interpreting the course plan.

A processing of the course determiner 38 according to the first embodiment will be described in detail. The course determiner 38 determines a course of the host vehicle 102 so that a lateral position of the host vehicle 102 within a lane at a target stop position coincides with a lateral position of the following vehicle 104 within the same lane, and the host vehicle 102 is positioned parallel to a lane dividing line at the target stop position. In addition, the course determiner 38 determines a course of the host vehicle 102 so that a lateral position of the host vehicle 102 within a lane at a target stop position coincides with a lateral position of the following vehicle 104 within the same lane, and an angle between the host vehicle 102 and a lane dividing line does not exceed a predetermined value (for example, 10 degrees) during movement to the target stop position.

In the first embodiment, the lateral positions within the lane coinciding with each other means that a lateral position of a central portion of the vehicle body of the host vehicle 102 within the lane coincides with a lateral position (50%, when a position of the right side surface is 25% and a position of the left side surface is 75%) of the central position of the vehicle body of the following vehicle 104 within the same lane. A lateral position within a lane can also be regarded as a distance from a lane dividing line (a centerline or outer edge line of the lane) to a central portion of a vehicle body.

In addition, a priority in course determination is as follows in a descending order: (1) an angle between the host vehicle 102 and a lane dividing line does not exceed a predetermined value during movement to a target stop position; (2) the host vehicle 102 at the target stop position is positioned parallel to the lane dividing line; and (3) a lateral position of the host vehicle 102 at the target stop position coincides with a lateral position of the following vehicle 104. Accordingly, when it is assumed that the lateral position of the host vehicle 102 at the target stop position coincides with the lateral position of the following vehicle 104, if the angle between the host vehicle 102 and a lane dividing line exceeds the predetermined value during movement to the target stop position, a course in which the lateral position of the host vehicle 102 at the target stop position does not coincide with the lateral position of the following vehicle 104.

Figure 6:
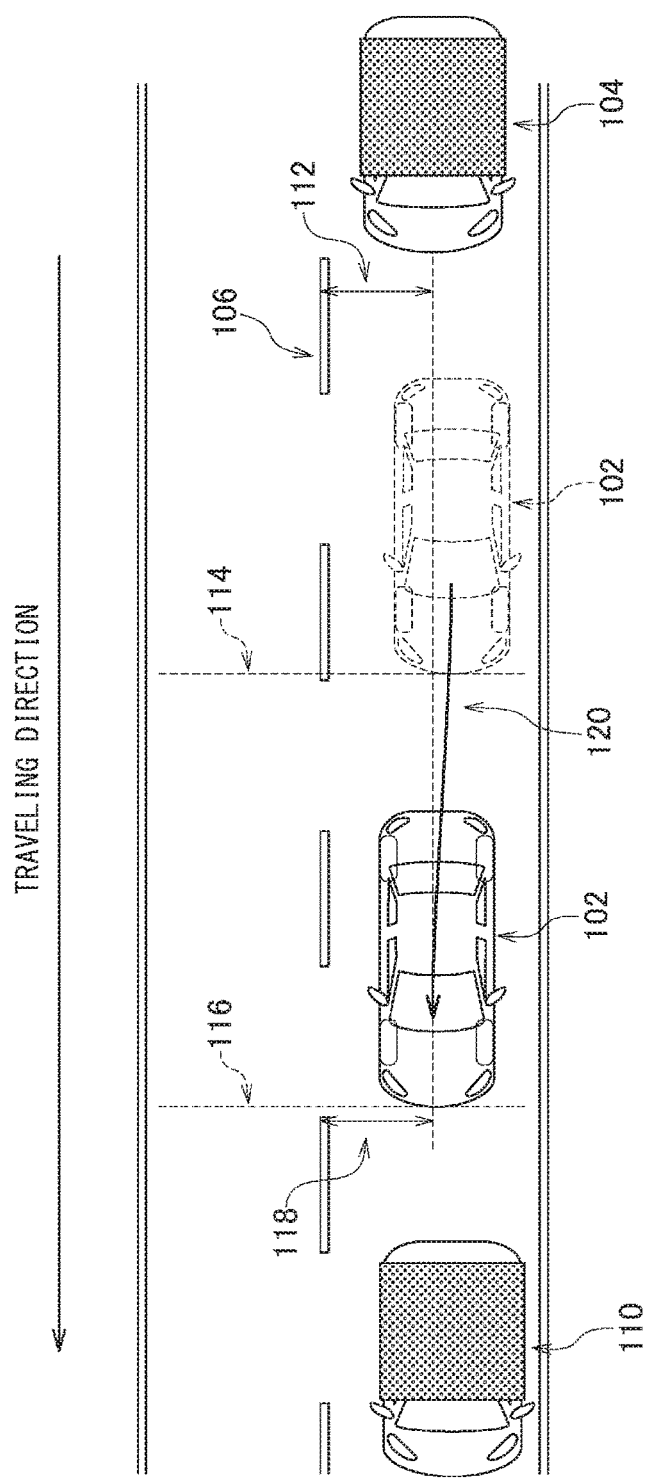
FIG. 6 is a diagram illustrating an example of a course of a host vehicle.

FIG. 6 illustrates an example of a course of the host vehicle 102. In FIG. 6, the host vehicle 102 before movement is indicated by a broken line, and the host vehicle 102 after the movement is indicated by a solid line. The host vehicle 102 before the movement stops at a current stop position 114 due to traffic congestion. The vehicle recognizer 34 of the host vehicle 102 detects an offset 112 of the following vehicle 104 and the offset storage 36 stores the offset 112. Here, when a preceding vehicle 110 moves forward, the course determiner 38 of the host vehicle 102 determines a target stop position 116.

The course determiner 38 determines a course plan 120 so that an offset 118 of the host vehicle 102 at the target stop position 116 coincides with the offset 112 of the following vehicle 104 under restrictive conditions that the host vehicle 102 at the target stop position 116 is positioned in parallel to a lane dividing line and an angle between the host vehicle 102 and the lane dividing line 106 does not exceed a predetermined value during movement to the target stop position 116. As a result, the host vehicle 102 moves toward the right front of the following vehicle 104.

Figure 7:
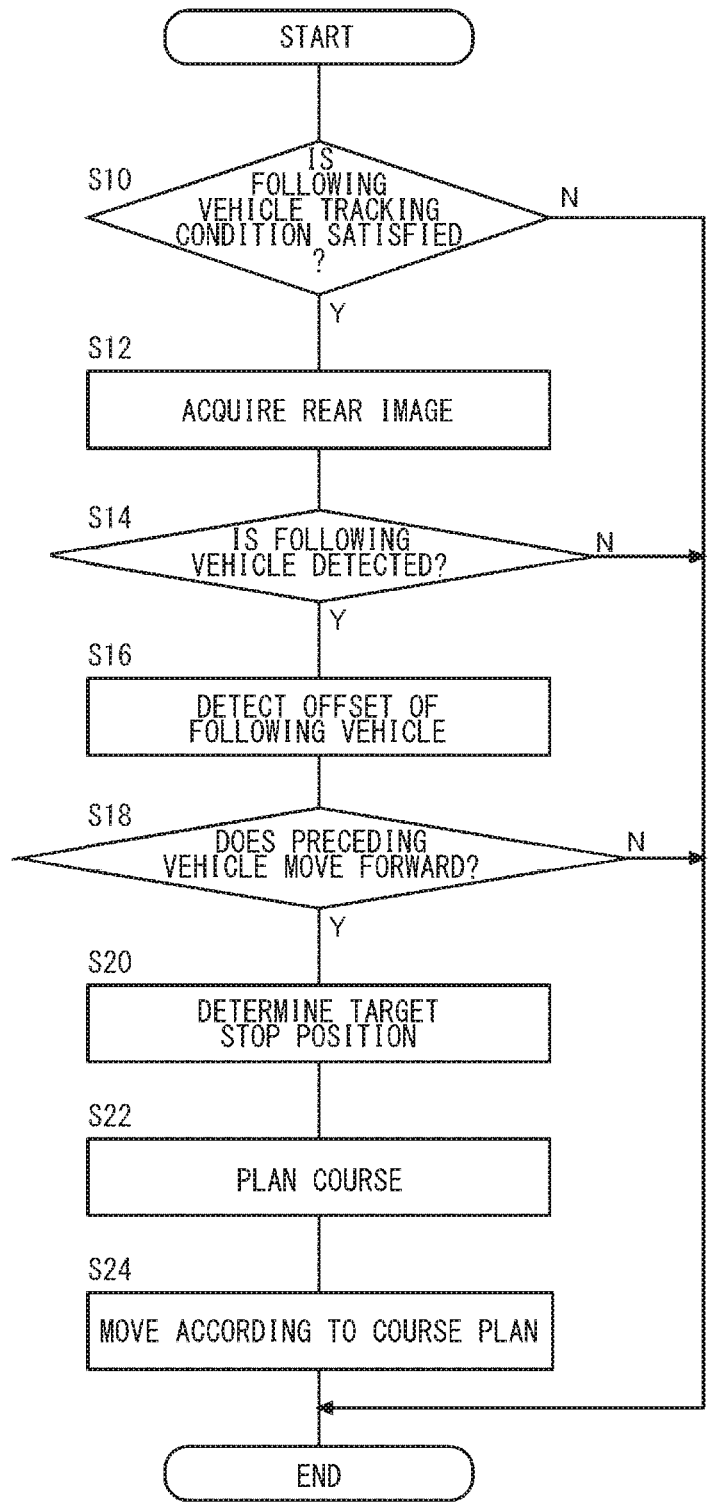
FIG. 7 is a flowchart illustrating an operation of the vehicle control device according to the first embodiment.

FIG. 7 is a flowchart illustrating an operation of the vehicle control device 30 according to the first embodiment. When the vehicle control device 30 is notified of an input of an operation of setting a traveling mode to the lane maintaining mode from the operation input device 20, and a traveling speed is equal to or less than a predetermined threshold value (for example, equal to or less than 10 kilometers per hour) (Y in S10), the vehicle control device 30 determines that a following vehicle tracking condition is satisfied, and executes following vehicle tracking processing from S12. When the following vehicle tracking condition is not satisfied (N in S10), the processing from S12 is skipped and the flow of processing in FIG. 7 ends.

For convenience of explanation, hereinafter, following vehicle tracking processing based on a rear image output from the rear image capturing device 10 will be described. The sensing data acquiring unit 31 acquires a rear image (S12). The lane sensor 32 senses a lane dividing line dividing off a lane in which the host vehicle 102 travels based on the rear image. The vehicle recognizer 34 detects a presence or absence of the following vehicle 104 which is traveling or is being stopped within a predetermined distance (for example, within five meters from the host vehicle 102) from the host vehicle 102 based on the rear image. When the following vehicle 104 is present (Y in S14), the vehicle recognizer 34 further detects a lateral direction offset (a distance from the lane dividing line) of the following vehicle 104 (S16).

The sensing data acquiring unit 31 acquires measurement result data output from the front distance measuring device 16. The vehicle recognizer 34 detects forward movement of the preceding vehicle when the preceding vehicle moves forward, based on the measurement data. When the forward movement of the preceding vehicle is detected (Y in S18), the course determiner 38 determines a target stop position of the host vehicle 102 (S20). The course determiner 38 plans a course to the target stop position so that a lateral direction offset of the host vehicle 102 at the target stop position coincides with the lateral direction offset of the following vehicle 104 detected in S16 (S22). The traveling controller 40 causes the host vehicle 102 to move to the target stop position according to the course plan determined by the course determiner 38 (S24).

When the forward movement of the preceding vehicle is not detected (N in S18), the processing from S20 is skipped and the flow of processing in FIG. 7 ends. Further, when the following vehicle is not detected (N in S14), the processing from S16 is skipped and the flow of processing in FIG. 7 ends. In practice, the flow of processing in FIG. 7 is repeatedly performed while the following vehicle tracking condition in S10 is satisfied.

Figure 8:
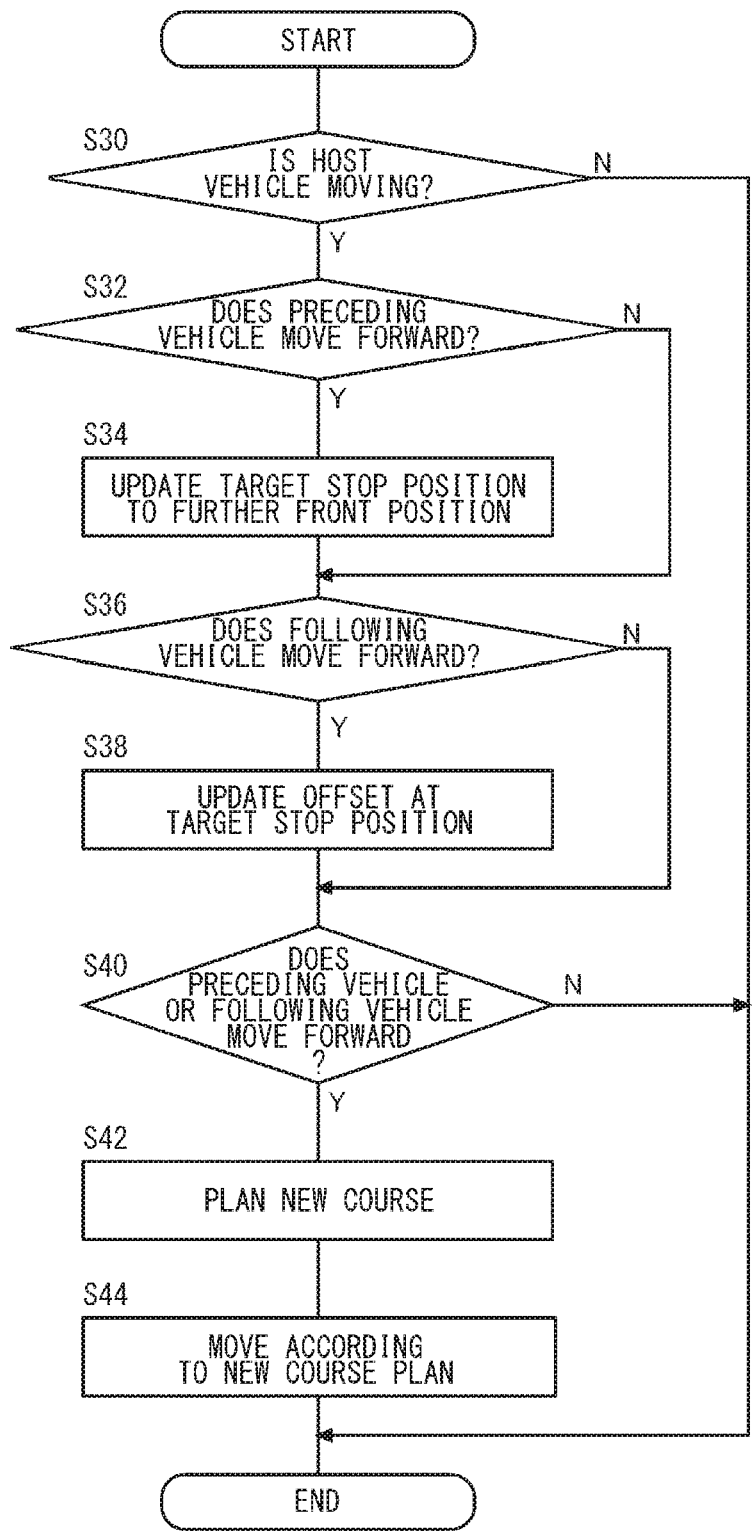
FIG. 8 is a flowchart illustrating an operation of the vehicle control device according to the first embodiment.

FIG. 8 is a flowchart illustrating an operation of the vehicle control device 30 according to the first embodiment. Here, it is assumed that the host vehicle 102 is moving according to the processing in S24 in FIG. 7 (Y in S30). When the host vehicle 102 is not moving (N in S30), the flow of processing in FIG. 8 ends. When the preceding vehicle 110 moves forward, that is, when the preceding vehicle 110 moves away from the host vehicle 102, the vehicle recognizer 34 detects the forward movement of the preceding vehicle 110 based on the measurement result of the front distance measuring device 16. In addition, the vehicle recognizer 34 detects forward movement of the following vehicle 104 when the following vehicle 104 moves forward, based on the rear image output from the rear image capturing device 10.

When the preceding vehicle 110 moves forward (Y in S32), the course determiner 38 determines a new target stop position in front of the target stop position (S34). When the preceding vehicle 110 does not move forward (N in S32), the processing in S34 is skipped. When the following vehicle 104 moves forward (Y in S36), the vehicle recognizer 34 detects a new lateral direction offset of the following vehicle 104. The course determiner 38 updates the lateral direction offset of the host vehicle 102 at the target stop position so that the lateral direction offset of the host vehicle 102 at the target stop position coincides with the new lateral direction offset of the following vehicle 104 (S38). When the following vehicle 104 does not move forward (N in S36), the processing in S38 is skipped.

When at least one of the following vehicle 104 and the preceding vehicle 110 moves forward (Y in S40), a new course of the host vehicle 102 is planned according to at least one of the target stop position after the update and the lateral direction offset after the update (S42). For example, when only the preceding vehicle 110 moves forward and the following vehicle 104 does not move forward, a new course may be planned according to a new target stop position and the existing lateral direction offset of the following vehicle 104. Further, when only the following vehicle 104 moves forward and the preceding vehicle 110 does not move forward, a new course may be planned according to the existing target stop position and a new lateral direction offset of the following vehicle 104.

The traveling controller 40 causes the host vehicle 102 to move to a target stop position according to a new course plan determined by the course determiner 38 (S44). When both of the following vehicle 104 and the preceding vehicle 110 do not move forward, in other words, when both of the following vehicle 104 and the preceding vehicle 110 maintain a stopped state (N in S40), processing in S42 and S44 is skipped.

According to the vehicle control device 30 of the first embodiment, it is possible to implement a control of a lateral position of a host vehicle by actively using a following vehicle 104 for shielding. For example, even when the two-wheeled vehicle 108 approaches the host vehicle 102 by passing through between the following vehicle 104 and the lane dividing line 106, since a width of an exposed portion of the host vehicle 102, when viewed from behind the host vehicle 102, is small, it is possible to lower a risk that the host vehicle 102 collides with the two-wheeled vehicle 108. Similarly, even when the two-wheeled vehicle 108 approaches from a hard shoulder, rather than the centerline, it is possible to lower the risk that the host vehicle 102 collides with the two-wheeled vehicle 108.

Next, an exception of the following vehicle tracking processing according to the first embodiment will be described. In the following cases 1 to 5, the vehicle control device 30 suppresses the control of matching the lateral direction offset of the host vehicle 102 with the lateral direction offset of the following vehicle 104.

Case 1 is a case where data indicating that a planned branching position (or the planned right turn or left turn) is near are input from the navigation device 18. In this case, a control according to a second embodiment to be described later may be performed, or the control of the vehicle may be entrusted to the driver after notification.

Case 2 is a case where a shift from traveling at a predetermined speed (for example, 10 kilometers per hour) to traveling at a middle-to-high speed is possible. In detail, congestion information is not input from the navigation device 18 and the preceding vehicle 110 is not detected or is separate from the host vehicle by a predetermined distance or more. In this case, since the host vehicle travels while being separate from the following vehicle, for example, a control of allowing the lateral position of the host vehicle to be maintained at the center of a lane may be performed.

Case 3 is a case where when a distance between the following vehicle 104 and the lane dividing line (a centerline, an outer edge line of a lane, or the like) is smaller than a predetermined threshold value, or the following vehicle 104 drives over or crosses the lane dividing line. In this case, it is preferable to stop following vehicle tracking, therefore, for example, a control of allowing the lateral position of the host vehicle to be maintained at the center of a lane may be performed.

Case 4 is a case where when the following vehicle 104 shows a motion such as a course change or a right turn or left turn, or indicates of an intention of a course change or a right turn or left turn. In detail, when the following vehicle 104 changes a course or turns right or left (for example, when an angle between the following vehicle 104 and a lane dividing line exceeds a predetermined threshold value), or when a direction indicator of the following vehicle 104 is turned on (blinks), the vehicle recognizer 34 detects the motion of the following vehicle 104 such as the course change or the right turn or left turn, or the intention of the course change or the right turn or left turn based on the rear image. When the motion of the following vehicle 104 such as the course change or the right turn or left turn, or the intention of the course change or the right turn or left turn is detected, the course determiner 38 stops to determine a course of the host vehicle 102 so that the lateral position (lateral direction offset) of the host vehicle 102 matches with the lateral position of the following vehicle 104. This is because it is preferable to stop the following vehicle tracking, and it is thus considered that the following vehicle 104 in Case 4 changes a course or turns right or left. In this case, for example, a control of allowing the lateral position of the host vehicle to be maintained at the center of a lane may be performed.

Case 5 is a case where a change amount of the lateral position of the following vehicle 104 exceeds a predetermined threshold value by more than a predetermined number of times within a predetermined time. In other words, Case 5 is a case where the following vehicle 104 repeatedly performs a behavior of largely changing the lateral position thereof. In detail, when the following vehicle 104 changes the lateral position thereof by an amount exceeding a predetermined threshold value, the vehicle recognizer 34 detects the change, and when the number of times by which the vehicle recognizer 34 detects the change of the lateral position of the following vehicle 104 by the amount exceeding the predetermined threshold value, exceeds a predetermined number of times (for example three times) within a predetermined time (for example, 30 seconds), the course determiner 38 stops determining the course of the host vehicle 102 so that the lateral position of the host vehicle 102 matches with the lateral position of the following vehicle 104. The following vehicle 104 in Case 5 is likely to meander or a driver of the following vehicle 104 in Case 5 is likely to feel an antipathy for being obstructed by the host vehicle 102. For this reason, it is preferable to stop the following vehicle tracking in order to prevent troubles. In this case, it is desirable to stop following vehicle tracking, therefore, for example, a control of allowing the lateral position of the host vehicle to be maintained at the center of a lane may be performed.

Hereinabove, an example of the exception has been described. However, it goes without saying that there are various vehicle controls which should be prioritized over the vehicle control according to the present disclosure. For example, when an obstacle is detected in a traveling direction, a vehicle control for avoiding collision is prioritized. In addition, since there is a possibility that the driver is trying to avoid a dangerous situation which cannot be detected, an arbitrary control of the vehicle by the driver is allowed. Therefore, even when the driver starts a handle operation at a torque equal to or more than a predetermined threshold value, the control of the lateral position of the host vehicle may be suppressed.

Hereinabove, the present disclosure has been described based on the first embodiment. The first embodiment is an example, and those skilled in the art will understand that various modifications of a combination of the respective components or the respective processing processes of the first embodiment can be made, and the modifications are also within the scope of the present disclosure.

Second Embodiment

A second embodiment suggests a technology of suitably controlling a lateral position of a host vehicle 102 when checking an area behind the host vehicle 102. In other words, a technology of suitably controlling a lateral direction offset of the host vehicle 102 in a lane when there is a need to check an area behind the host vehicle 102 is suggested.

Figure 9:
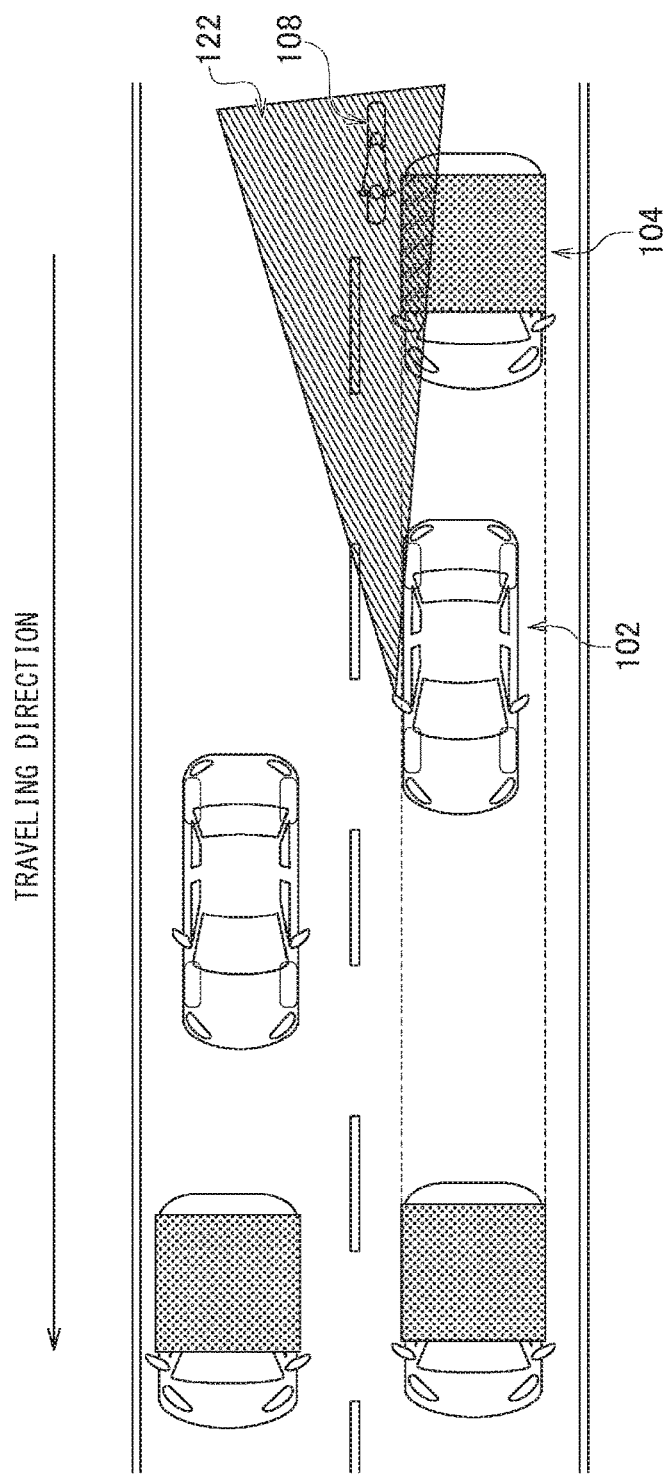
FIG. 9 is a diagram illustrating an operation of Step 1 of the host vehicle when checking an area behind the host vehicle.

FIG. 9 illustrates an operation of Step 1 of the host vehicle 102 when checking an area behind the host vehicle 102. When a lane change is performed, the host vehicle 102 needs to avoid blocking by the following vehicle 104 and secure a rear visual field of an area to which the lane change is to be performed. In other words, there is a need to decrease a range blocked by a following vehicle 104 in an image capturing range of a rear image capturing device 10.

Therefore, when the rear visual field should be secured, the host vehicle 102 (vehicle control device 30) according to the second embodiment moves so that a lateral position of a side surface of a vehicle body of the host vehicle 102 coincides with a lateral position of a side surface of a vehicle body of the following vehicle 104 as an operation of Step 1, the side surfaces face an area of which a rear visual field should be secured (for example, an area to which a lane change is to be performed). As a result, when a two-wheeled vehicle 108 is present, it is possible to detect the two-wheeled vehicle 108 in an image capturing range 122 of a right image capturing device 12*a*. That is, it is possible to secure a rear visual field while reducing a risk of collision with the two-wheeled vehicle 108 by decreasing a width of an exposed portion of the host vehicle 102 to a minimum.

Figure 10:
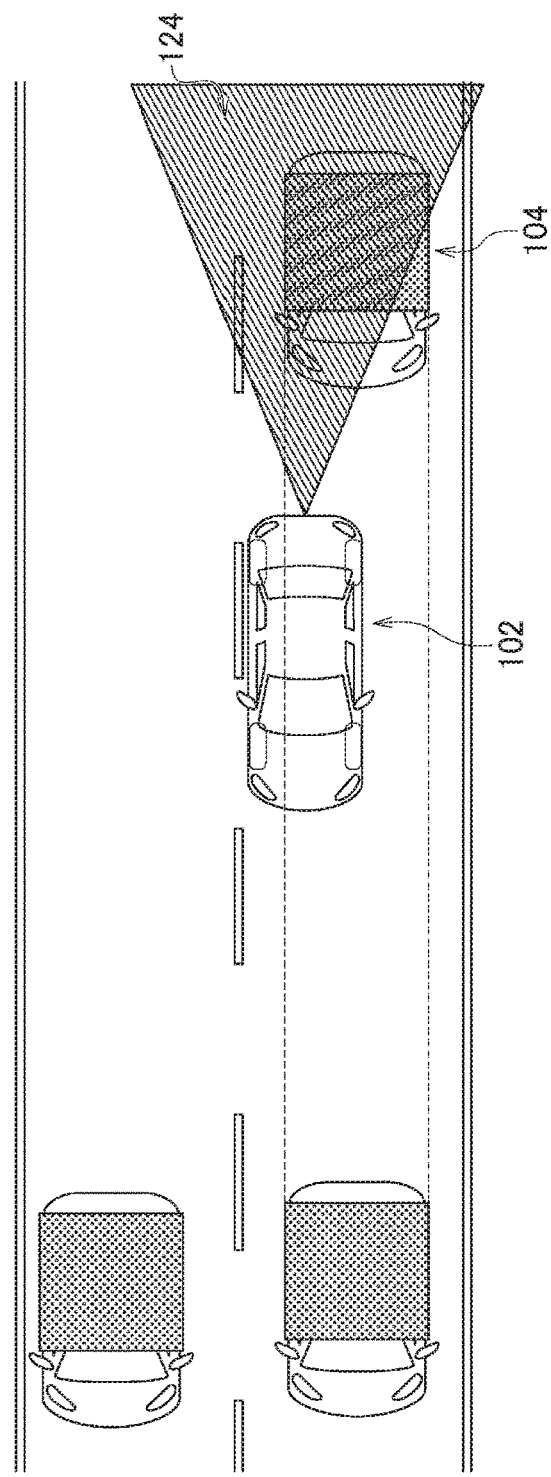
FIG. 10 is a diagram illustrating an operation of Step 2 of the host vehicle when checking an area behind the host vehicle.

FIG. 10 illustrates an operation of Step 2 of the host vehicle 102 when checking an area behind the host vehicle 102. When a rear visual field should be secured, the host vehicle 102 according to the second embodiment checks safety of an area of a lateral-rear side (oblique right-rear side or oblique left-rear side) of the host vehicle 102 at the position in Step 1, and then further moves to a lateral position at which an area behind the host vehicle can be detected as an operation of Step 2. In other words, the host vehicle 102 moves to a lateral position at which an image capturing range 124 of the rear image capturing device 10 can be secured. As described above, the lateral position of the host vehicle 102 is changed in two steps, such that it is possible to reduce the risk of collision with the two-wheeled vehicle 108.

A configuration of the host vehicle 102 according to the second embodiment is the same as that according to the first embodiment (FIG. 3). Hereinafter, a description overlapping with the description of the first embodiment will be omitted, and a configuration different from that of the first embodiment will mainly be described.

Figure 11:
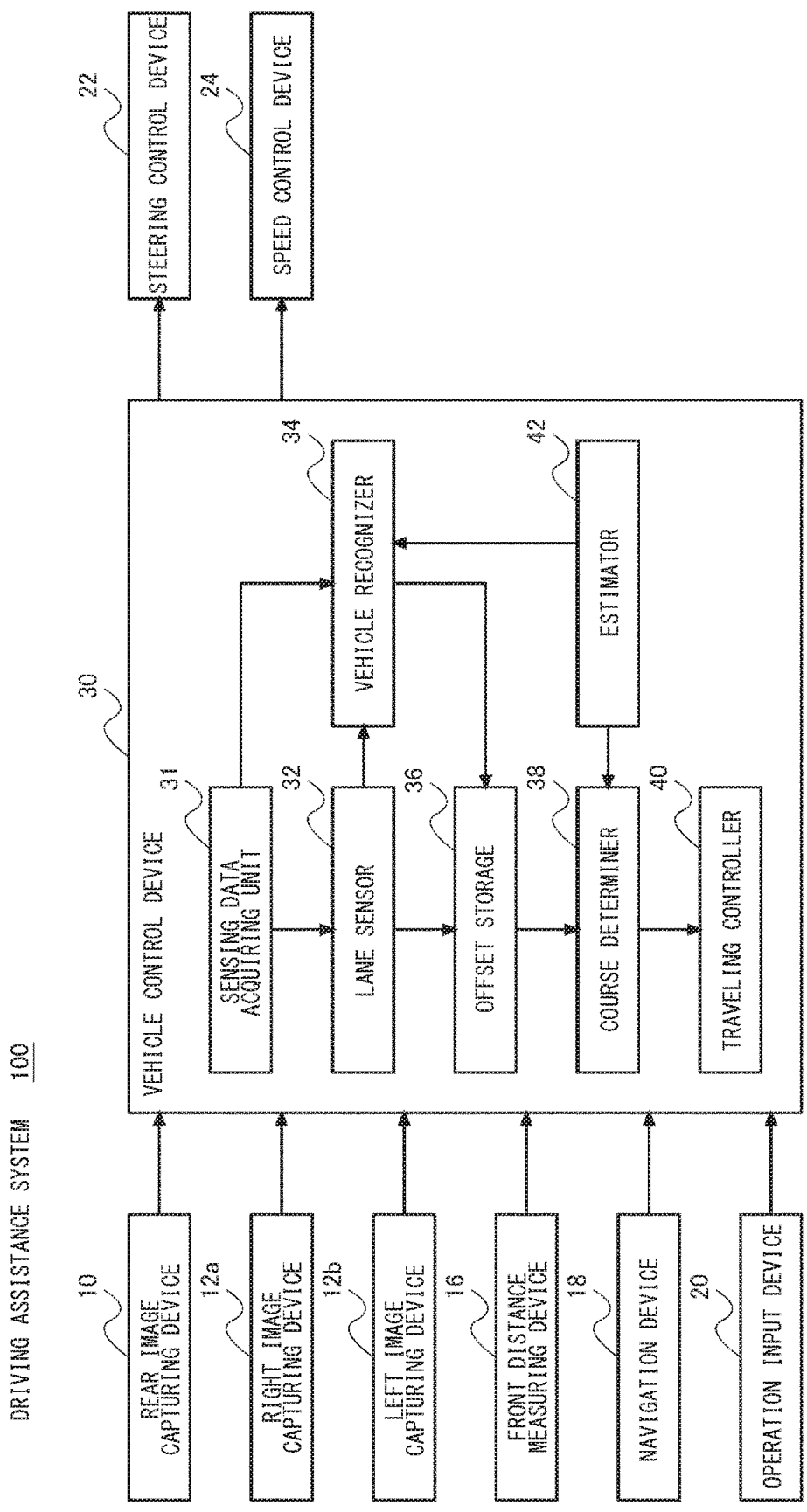
FIG. 11 is a block diagram illustrating functions of a driving assistance system according to a second embodiment.

FIG. 11 is a block diagram illustrating functions of a driving assistance system 100 according to the second embodiment. The driving assistance system 100 according to the second embodiment is different from that according to the first embodiment in that a vehicle control device 30 further includes an estimator 42, but other configurations of the driving assistance system 100 according to the second embodiment are the same as those of the driving assistance system 100 according to the first embodiment.

The estimator 42 estimates whether or not an area behind the host vehicle 102 needs to be checked based on an operation by the driver with respect to the host vehicle 102 or a planned traveling route of the host vehicle 102. In the embodiment, the estimator 42 estimates that the area behind the host vehicle 102 needs to be checked in the following cases: (1) a case where a steering operation by the driver at a torque equal to or less than a predetermined threshold value is detected by a steering control device 22; (2) a case where an operation by the driver for a direction indicator is detected (for example, when an operation of causing a left or right direction indicator to blink is input); or (3) a case where a branching point in the planned traveling route is near (for example, when receiving a notification that the branching point is near from a navigation device 18). It should be noted that the estimator 42 can also be regarded as estimating an intention of the driver to check the area behind the host vehicle 102.

When the estimator 42 estimates that the area behind the host vehicle 102 needs to be checked, a vehicle recognizer 34 detects a width of a rear visual field of the host vehicle 102. When the rear visual field of the host vehicle 102 is small due to blocking by the following vehicle 104, the vehicle recognizer 34 detects that the rear visual field of the host vehicle 102 is small based on a rear image or sensor data output from a predetermined sensor (a radar device (not illustrated) or the like). The rear visual field of the host vehicle 102 can be regarded as a range which can be effectively monitored by using a rear image and the rear visual field being small can mean that a blind area generated by the following vehicle 104 is large.

For example, the vehicle recognizer 34 may process an image output from the rear image capturing device 10 by using a known pattern matching technology, recognize an image of a front surface of the vehicle body of the following vehicle 104, and recognize an area in which the image of the front surface of the vehicle body of the following vehicle 104 is reflected as an area (herein, referred to as a "blocked area") blocked by the following vehicle 104. The blocked area is an area blocked by the following vehicle 104 and can also be regarded as an area in which the following vehicle 104 is reflected. When a proportion of a blocked area in a rear image exceeds a predetermined threshold value (for example, 40%), the vehicle recognizer 34 may determine that the rear visual field of the host vehicle 102 is small.

When it is detected that the rear visual field of the host vehicle 102 is small, a course determiner 38 determines a course of the host vehicle 102 so that the host vehicle 102 moves to a position (hereinafter, referred to as a "side surface coinciding position") at which the position of the side surface of the host vehicle 102 coincides with the position of the side surface of the following vehicle 104. The course determiner 38 plans a course so that a position of the side surface of the host vehicle 102 matches with a position of the side surface of the following vehicle 104, the side surfaces facing an area in which branching, a lane change, or a right turn or left turn is to occur. For example, the course determiner 38 plans a course so that a position of a right side surface of the host vehicle 102 coincides with a position of a right side surface of the following vehicle 104 when the host vehicle 102 performs a lane change to the right. The course determiner 38 determines a course of the host vehicle 102 so that the host vehicle 102 is positioned in parallel to a lane dividing line at the side surface coinciding position, and determines the course of the host vehicle 102 so that an angle between the host vehicle 102 and a lane dividing line does not exceed a predetermined value in a process of moving to the side surface coinciding position. Therefore, this course is a course in which the vehicle body of the host vehicle 102 smoothly moves to the right.

When the host vehicle 102 reaches the side surface coinciding position, the vehicle recognizer 34 detects that the host vehicle 102 reaches the side surface coinciding position based on a rear image, a right side image, and a left side image. The vehicle recognizer 34 detects a presence or absence of another vehicle (hereinafter, referred to as an "approaching vehicle") approaching the host vehicle 102 at the side surface coinciding position. The approaching vehicle is a vehicle approaching the host vehicle 102 from behind the following vehicle 104, and typically, a two-wheeled vehicle 108 runs through between a lane dividing line 106 and the following vehicle 104.

When an approaching vehicle is not detected at the side surface coinciding position, the course determiner 38 determines a new course of the host vehicle 102 so that the host vehicle 102 moves to a position at which an area blocked (blocking of a rear image in the embodiment) by the following vehicle 104 further becomes smaller. For example, as illustrated in FIG. 10, when the host vehicle 102 performs a lane change to the right or turns right, a new course is determined so that the host vehicle 102 moves to the right, crossing a side surface coinciding position. In contrast, when the host vehicle 102 performs a lane change to the left or turns left, a new course is determined so that the host vehicle 102 moves to the left, crossing a left side surface coinciding position. The course determiner 38 may determine a new lateral position at a target stop position, which crosses the side surface coinciding position, but does not cross a lane dividing line, and may determine a course so that the host vehicle 102 reaches the new lateral position at the target stop position.

When an approaching vehicle is detected at the side surface coinciding position, the course determiner 38 determines a course of the host vehicle 102 so that the host vehicle 102 returns to a position right in front of the following vehicle 104 as described in the first embodiment. In detail, the course determiner 38 determines the course of the host vehicle 102 so that a lateral position (lateral direction offset) of the central portion of the vehicle body of the host vehicle 102 at the target stop position coincides with a lateral direction (lateral direction offset) of the central portion of the vehicle body of the following vehicle 104.

Figure 12:
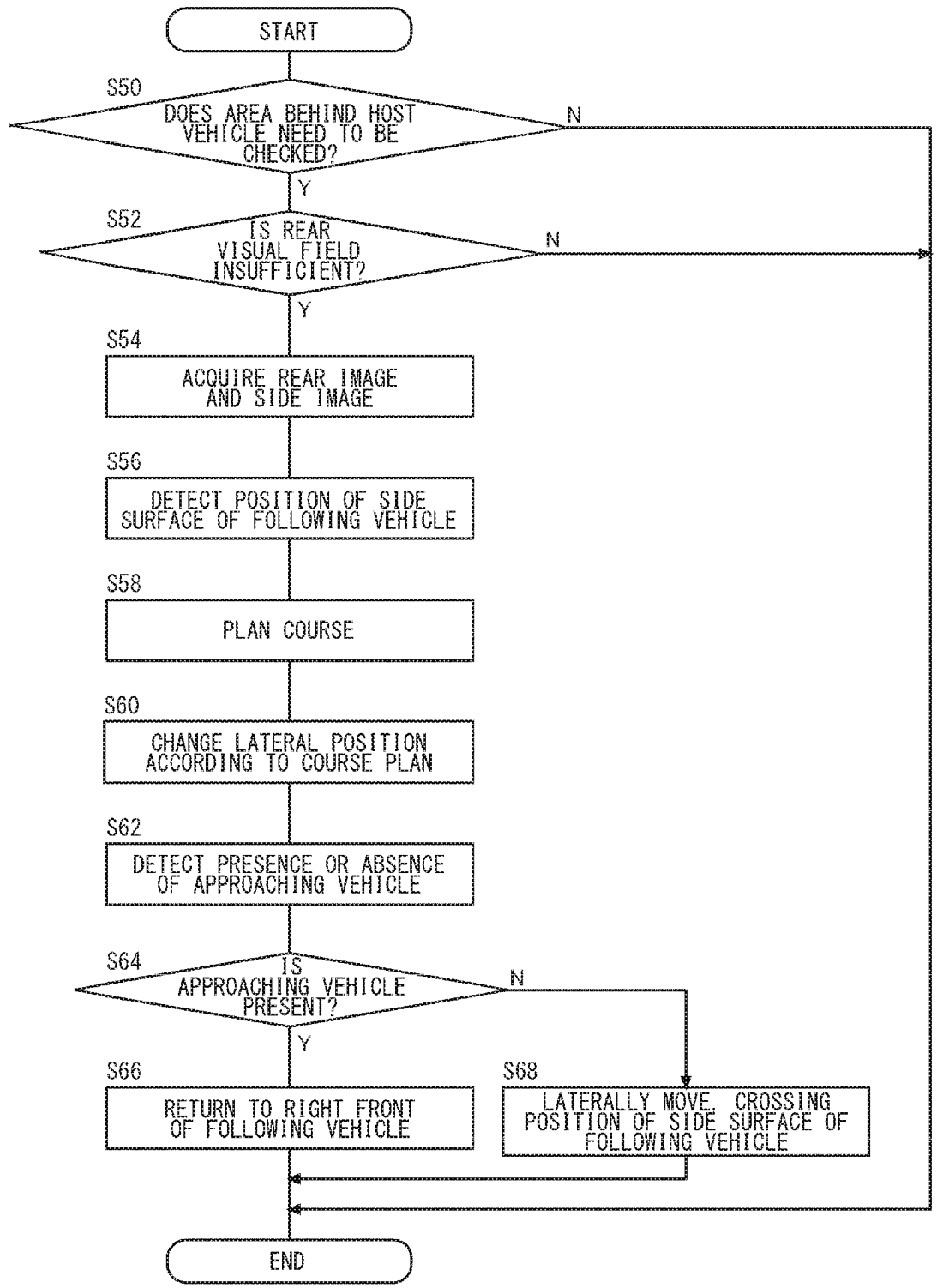
FIG. 12 is a flowchart illustrating an operation of a vehicle control device according to the second embodiment.

FIG. 12 is a flowchart illustrating an operation of the vehicle control device 30 according to the second embodiment. Here, it is assumed that the estimator 42 estimates that an area behind the host vehicle 102 needs to be checked (Y in S50), and it is detected that the rear visual field of the host vehicle 102 is less than a threshold vehicle (Y in S52). In addition, here, a situation in which the rear visual field of the host vehicle 102 is blocked by the following vehicle 104 when the host vehicle 102 performs a lane change to the right lane from a lane in which the host vehicle 102 currently travels, is assumed. A sensing data acquiring unit 31 acquires a rear image, a right side image, and a left side image (S54), and the vehicle recognizer 34 detects a lateral position of a right side surface of the vehicle body of the following vehicle 104 based on these images (S56). This lateral position can be regarded as a lateral direction offset from a lane dividing line, and may also represent a position of the right side surface of the vehicle body of the following vehicle 104 and expressed as 0% at the centerline and as 100% at an outer edge line of a lane, similarly to the first embodiment.

The course determiner 38 plans a course of the host vehicle 102 so that a lateral position of the right side surface of the vehicle body of the host vehicle 102 coincides with a lateral position of the right side surface of the vehicle body of the following vehicle 104 (S58). The traveling controller 40 causes the host vehicle 102 to move according to the course plan determined by the course determiner 38, thereby making the lateral position of the right side surface of the vehicle body of the host vehicle 102 coincide with the lateral position of the right side surface of the vehicle body of the following vehicle 104 (S60). The sensing data acquiring unit 31 acquires the right side image output from the right image capturing device 12a and the vehicle recognizer 34 detects a presence or absence of an approaching vehicle such as a two-wheeled vehicle 108 approaching from the oblique right-rear side of the host vehicle 102 (S62).

It should be noted that the course determiner 38 may maintain a state where a lateral position of a side surface of the vehicle body of the host vehicle 102 coincides with a lateral position of a side surface of the vehicle body of the following vehicle 104 for a predetermined time. In other words, the course determiner 38 may determine a course in which the host vehicle 102 moves straight at the side surface coinciding position for at least the predetermined time. By doing so, it is possible to further improve accuracy of detection of an approaching vehicle.

When an approaching vehicle is detected (for example, when at least one two-wheeled vehicle 108 is detected) (Y in S64), the course determiner 38 plans a new course of the host vehicle 102 so that a lateral direction offset of the central portion of the vehicle body of the host vehicle 102 at the target stop position coincides with a lateral direction offset of the central portion of the vehicle body of the following vehicle 104. The traveling controller 40 causes the host vehicle 102 to move to be in right front of the following vehicle 104 according to the new course plan determined by the course determiner 38 (S66).

When an approaching vehicle is not detected (N in S64), the course determiner 38 plans a new course of the host vehicle 102 so that a lateral position of the right side surface of the vehicle body of the host vehicle 102 crosses a lateral position of the right side surface of the vehicle body of the following vehicle 104, in other words, the host vehicle 102 moves to a position at which an area blocked by the following vehicle 104 in an image capturing range of the rear image capturing device 10 becomes smaller. The traveling controller 40 causes the host vehicle 102 to move more to the right according to the new course plan determined by the course determiner 38 (S68). When the rear visual field of the host vehicle 102 is the predetermined threshold value or more (that is, when the area blocked by the following vehicle 104 is not large) (N in S52), the processing from S54 is skipped and the flow of processing in FIG. 12 ends. Further, when the estimator 42 estimates that the area behind the host vehicle 102 need not be checked (N in S50), the processing from S52 is skipped and the flow of processing in FIG. 12 ends.

According to the vehicle control device 30 of the second embodiment, it is possible to decrease the range blocked by the following vehicle 104 while reducing the risk of collision with the two-wheeled vehicle 108 or the like approaching from behind, when the area behind the host vehicle 102 needs to be checked, but an image capturing range behind the host vehicle 102 is blocked by the following vehicle 104 or the like.

Hereinabove, the present disclosure has been described based on the second embodiment. The second embodiment is an example, and those skilled in the art will understand that various modifications of a combination of the respective components or the respective processing processes of the second embodiment can be made, and the modifications are also within the scope of the present disclosure.

For example, although FIG. 3 illustrates the configuration in which both of the image capturing device 12 and the mirror 14 are provided at both sides of the host vehicle, the area behind the host vehicle can be checked only with the image capturing device 12. Therefore, a configuration in which the mirror 14 is not provided can also be adopted.

A first modification of the second embodiment will be described. The host vehicle 102 may not include the side image capturing device 12 (the right image capturing device 12a and the left image capturing device 12b). That is, the host vehicle 102 may not include a means for detecting an object in an area of a lateral-rear side of the host vehicle 102. In this case, when the host vehicle 102 reaches a side surface coinciding position with respect to the following vehicle 104, the course determiner 38 may determine a course of the host vehicle 102 so that the host vehicle 102 continues to move straight. In the first modification, the host vehicle 102 waits until the driver checks an area behind the host vehicle 102 with his/her eyes by using a side mirror 14 or the like, and manually performs an operation such as avoidance or a lane change.

A second modification of the second embodiment will be described. The host vehicle 102 may not include the side image capturing device 12 (the right image capturing device 12a and the left image capturing device 12b). When the host vehicle 102 reaches a side surface coinciding position with respect to the following vehicle 104, the course determiner 38 may continue to move straight for a predetermined time (for example, 3 seconds) When the predetermined time passes without an input of a predetermined operation of canceling a lane change or a right or left turn from the driver, the course determiner 38 may determine a new course of the host vehicle 102 so that the host vehicle 102 moves to a position at which an area blocked by the following vehicle becomes smaller. When an approaching vehicle is present, it is considered that the driver will input an operation of avoidance within the predetermined time. Therefore, when the operation of avoidance is not input, the host vehicle 102 may be operated in the same manner as in the case where an approaching vehicle is not present according to the second embodiment.

As another form of the second modification of the second embodiment, a configuration in which the side image capturing device 12 is included, but the function of detecting an approaching vehicle from an image output from the side image capturing device 12. Even in this case, the operation of checking a presence or absence of an approaching vehicle can be entrusted to the driver, thus the vehicle may be controlled in the same manner.

A third modification of the second embodiment will be described. The processing in S52 illustrated in FIG. 12 may be skipped. That is, when the estimator 42 estimates that an area behind the host vehicle 102 needs to be checked, the course determiner 38 may determine a course of the host vehicle 102 so that the host vehicle 102 moves to a side surface coinciding position with respect to the following vehicle 104, regardless of whether or not the rear visual field of the host vehicle 102 is sufficient.

Third Embodiment

A third embodiment suggests a technology of suitably controlling a lateral position of a host vehicle 102 when checking an area in front of the host vehicle 102. In other words, the third embodiment suggests a technology of suitably controlling a lateral direction offset of the host vehicle 102 within a lane when an area in front of the host vehicle 102 needs to be checked.

Figure 13:
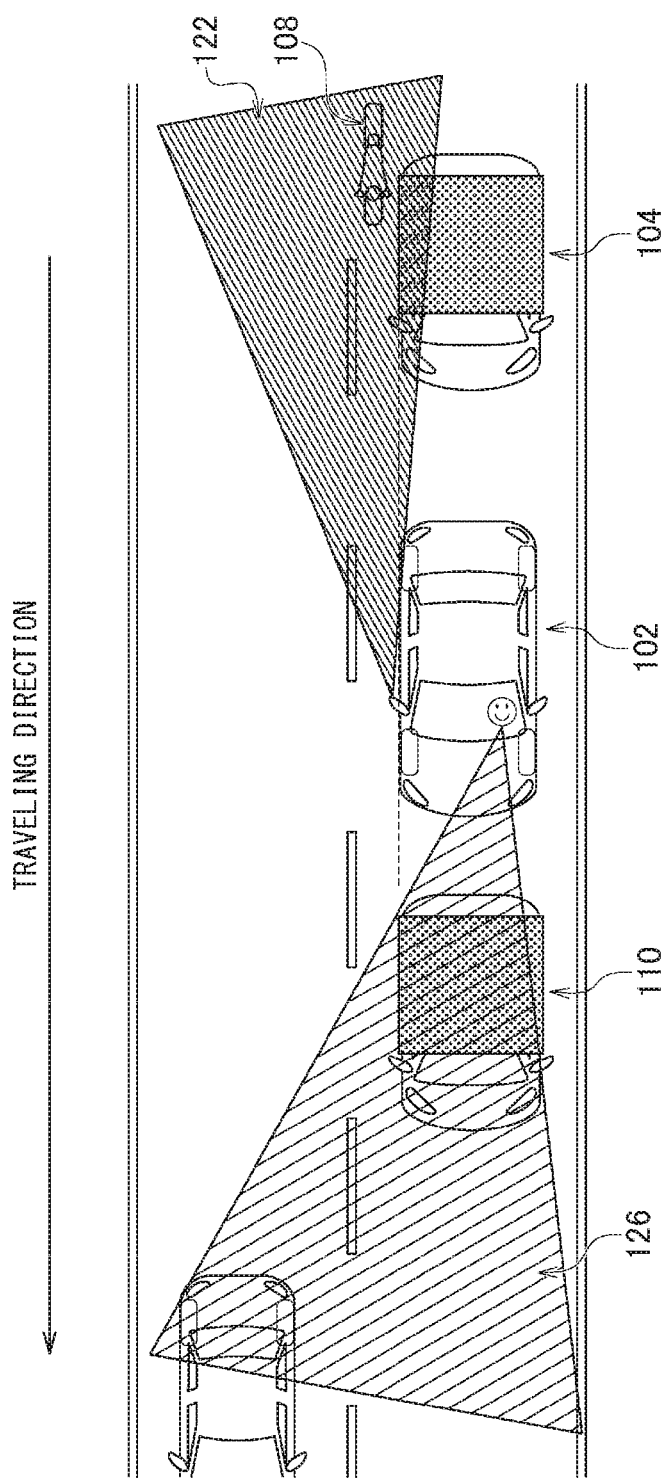
FIG. 13 is a diagram illustrating an operation of Step 1 of the host vehicle when checking an area in front of the host vehicle.

FIG. 13 illustrates an operation of Step 1 of the host vehicle 102 when checking an area in front of the host vehicle 102. When performing a lane change, the host vehicle 102 needs to check not only a situation behind the host vehicle 102, but also a situation in front of the host vehicle 102. For example, when a left-hand drive vehicle performs a lane change to the right, or on the contrary, when a right-hand drive vehicle performs a lane change to the left, there is a need to largely offset a lateral position of the host vehicle 102 in order to avoid blocking of a front visual field 126 by a preceding vehicle 110.

In this process, the host vehicle 102 according to the third embodiment moves so that a lateral position of a side surface of a vehicle body of the host vehicle 102 coincides with a lateral position of a side surface of a vehicle body of a following vehicle 104 in order to avoid coming into contact with a two-wheeled vehicle 108 approaching from behind the following vehicle 104 as an operation of Step 1. As a result, when a two-wheeled vehicle 108 is present, it is possible to detect the two-wheeled vehicle 108 in an image capturing range 122 of a right image capturing device 12a. That is, it is possible to secure a rear visual field while reducing a risk of collision with the two-wheeled vehicle 108 by decreasing a width of an exposed portion of the host vehicle 102 to a minimum.

Figure 14:
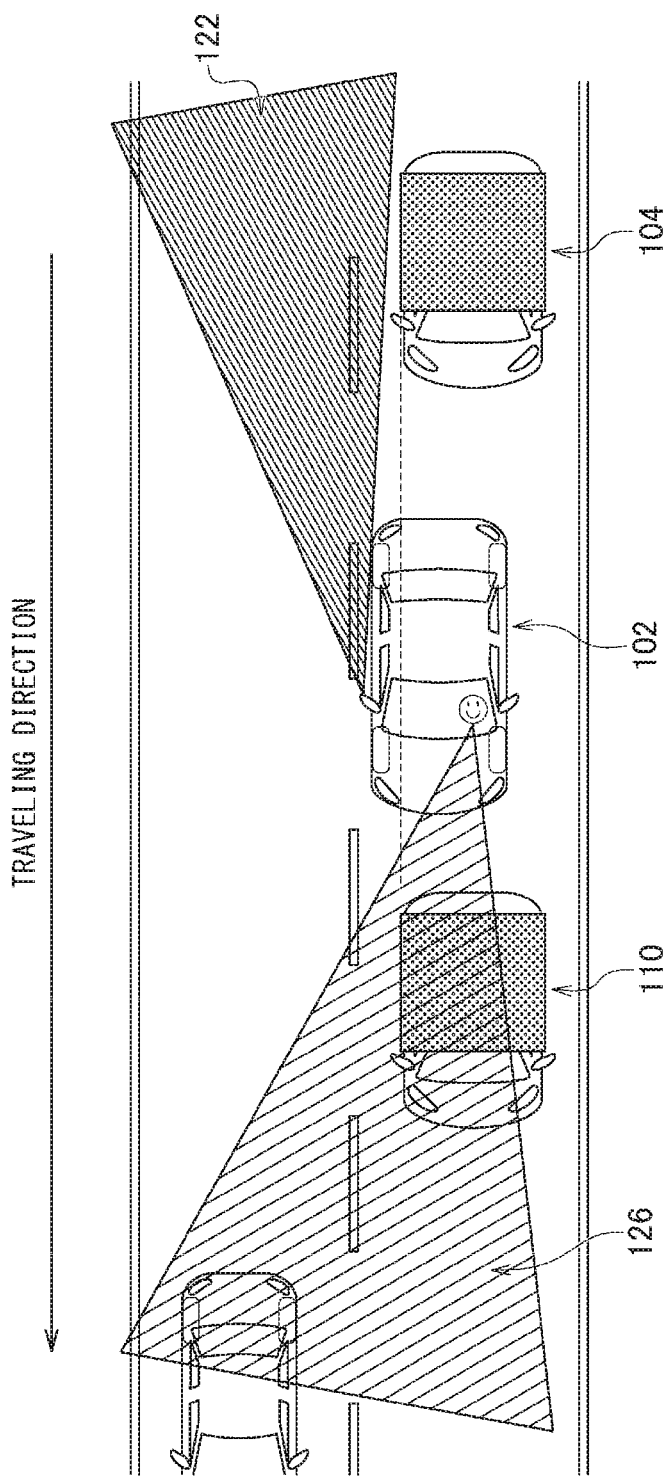
FIG. 14 is a diagram illustrating an operation of Step 2 of the host vehicle when checking the area in front of the host vehicle.

FIG. 14 illustrates an operation of Step 2 of the host vehicle 102 when checking an area in front of the host vehicle 102. When a front visual field should be secured, the host vehicle 102 according to the third embodiment checks safety of an area of a lateral-rear side (oblique right-rear side or oblique left-rear side) of the host vehicle 102 at the position to which the host vehicle 102 moves in Step 1, and then further moves to a lateral position at which an area in front of the host vehicle 102 can be detected by a sensor or with driver's eyes as an operation of Step 2. In other words, the host vehicle 102 moves to a lateral position at which the front visual field 126 can be sufficiently secured. As described above, the lateral position of the host vehicle 102 is changed in two steps, such that it is possible to reduce the risk of collision with the two-wheeled vehicle 108.

A configuration of the host vehicle 102 according to the third embodiment is the same as those according to the first and second embodiments (FIG. 3). In addition, a functional configuration of a driving assistance system 100 (vehicle control device 30) according to the third embodiment is the same as that according to the second embodiment (FIG. 11). Hereinafter, a description overlapping with the description of the embodiments described above will be omitted, and a configuration different from those of the embodiments will mainly be described.

An estimator 42 estimates whether or not an area in front of the host vehicle 102 needs to be checked based on an operation by the driver with respect to the host vehicle 102. In the embodiment, the estimator 42 estimates that the area in front of the host vehicle 102 needs to be checked in the following cases: (1) a case where a predetermined steering operation by the driver is detected by a steering control device 22, or a case where a predetermined steering operation is detected and a predetermined acceleration operation is detected by a speed control device 24. (2) a case where an operation by the driver for a direction indicator is detected (for example, when an operation of causing a left or right direction indicator to blink is input); or (3) a case where a predetermined operation of instructing passing during an automatic driving. It should be noted that the estimator 42 can also be regarded as estimating an intention of the driver to check the area in front of the host vehicle 102.

When the estimator 42 estimates that the area in front of the host vehicle 102 needs to be checked, a vehicle recognizer 34 detects a width of a front visual field of the host vehicle 102. When the front visual field of the host vehicle 102 is small due to blocking by the preceding vehicle 110, the vehicle recognizer 34 detects that the front visual field of the host vehicle 102 is small based on measurement result data output from a front distance measuring device 16. The front visual field of the host vehicle 102 can also be regarded as a range which can be effectively monitored by the front distance measuring device 16 or the driver.

For example, when the measurement result output from the front distance measuring device 16 shows that a proportion of an object at a predetermined distance (for example, within three meters) from the host vehicle 102 in a detection range of the front distance measuring device 16 exceeds a predetermined threshold value (for example, 40%), the vehicle recognizer 34 may determine that the front visual field of the host vehicle 102 is small. When an image capturing device capturing an image of the area in front of the host vehicle 102 is provided, the width of the front visual field may be detected based on an image captured by the image capturing device, similarly to the second embodiment. For example, when an image capturing device 12 attached to a mirror 14 includes a fish-eye lens, such that the area in front of the host vehicle 102 comes into view, or when another image capturing device 12' capturing an image of the area in front of the host vehicle 102 is included in the mirror 14, it is possible to check the area in front of the host vehicle 102 by using an image captured from a position of the mirror 14.

When it is detected that the front visual field of the host vehicle 102 is small, a course determiner 38 determines a course of the host vehicle 102 so that the host vehicle 102 moves to a position (side surface coinciding position) at which a position of a side surface of the host vehicle 102 coincides with a position of a side surface of the following vehicle 104. The course determiner 38 plans a course so that a position of the side surface of the host vehicle 102 matches with a position of the side surface of the following vehicle 104, the side surfaces facing an area in which branching, a lane change, or a right turn or left turn is to occur. For example, the course determiner 38 plans a course so that a position of a right side surface of the host vehicle 102 coincides with a position of a right side surface of the following vehicle 104 when the host vehicle 102 performs a lane change to the right. This course is a course in which the vehicle body of the host vehicle 102 moves right forward.

When the host vehicle 102 reaches the side surface coinciding position, the vehicle recognizer 34 detects that the host vehicle 102 reaches the side surface coinciding position based on a rear image, a right side image, and a left side image. The vehicle recognizer 34 detects a presence or absence of another vehicle (approaching vehicle) approaching the host vehicle 102 at the side surface coinciding position.

When an approaching vehicle is not detected at the side surface coinciding position, the course determiner 38 determines a new course of the host vehicle 102 so that the host vehicle 102 moves to a position at which an area blocked (blocking of a visual field of the driver in the embodiment) by the preceding vehicle 110 further becomes smaller. For example, as illustrated in FIG. 14, when the host vehicle 102 performs a lane change to the right or turns right, a new course is determined so that the host vehicle 102 moves to the right, crossing a side surface coinciding position with respect to the following vehicle. In contrast, when the host vehicle 102 performs a lane chance to the left or turns left, a new course is determined so that the host vehicle 102 moves to the left, crossing a left side surface coinciding position with respect to the following vehicle.

The course determiner 38 may determine a new lateral position at a target stop position, which crosses the side surface coinciding position, but does not cross a lane dividing line, and may determine a course so that the host vehicle 102 reaches the new lateral position at the target stop position. As a specific example of the new lateral position, a lateral position of the side surface of the host vehicle 102 coinciding with a lateral position of a side surface of the preceding vehicle 110 is suitable, when the image capturing device 12 attached to the mirror 14 includes a fish-eye lens, such that the area in front of the host vehicle 102 comes into view, or when another image capturing device 12' capturing an image of the area in front of the host vehicle 102 is included in the mirror 14. At this position, safety can be further secured, because the front visual field for checking the area in front of the host vehicle 102 can be sufficiently obtained by the image capturing device, and exposure of the host vehicle 102 with respect to a two-wheeled vehicle approaching from behind is decreased even in a case where a two-wheeled vehicle appears from behind the following vehicle when checking the area in front of the host vehicle 102.

When an approaching vehicle is detected at the side surface coinciding position, the course determiner 38 determines a course of the host vehicle 102 so that the host vehicle 102 returns to a position right in front of the following vehicle 104 as described in the first embodiment. In detail, the course determiner 38 determines the course of the host vehicle 102 so that a lateral position (lateral direction offset) of the central portion of the vehicle body of the host vehicle 102 at the target stop position coincides with a lateral direction (lateral direction offset) of the central portion of the vehicle body of the following vehicle 104.

Figure 15:
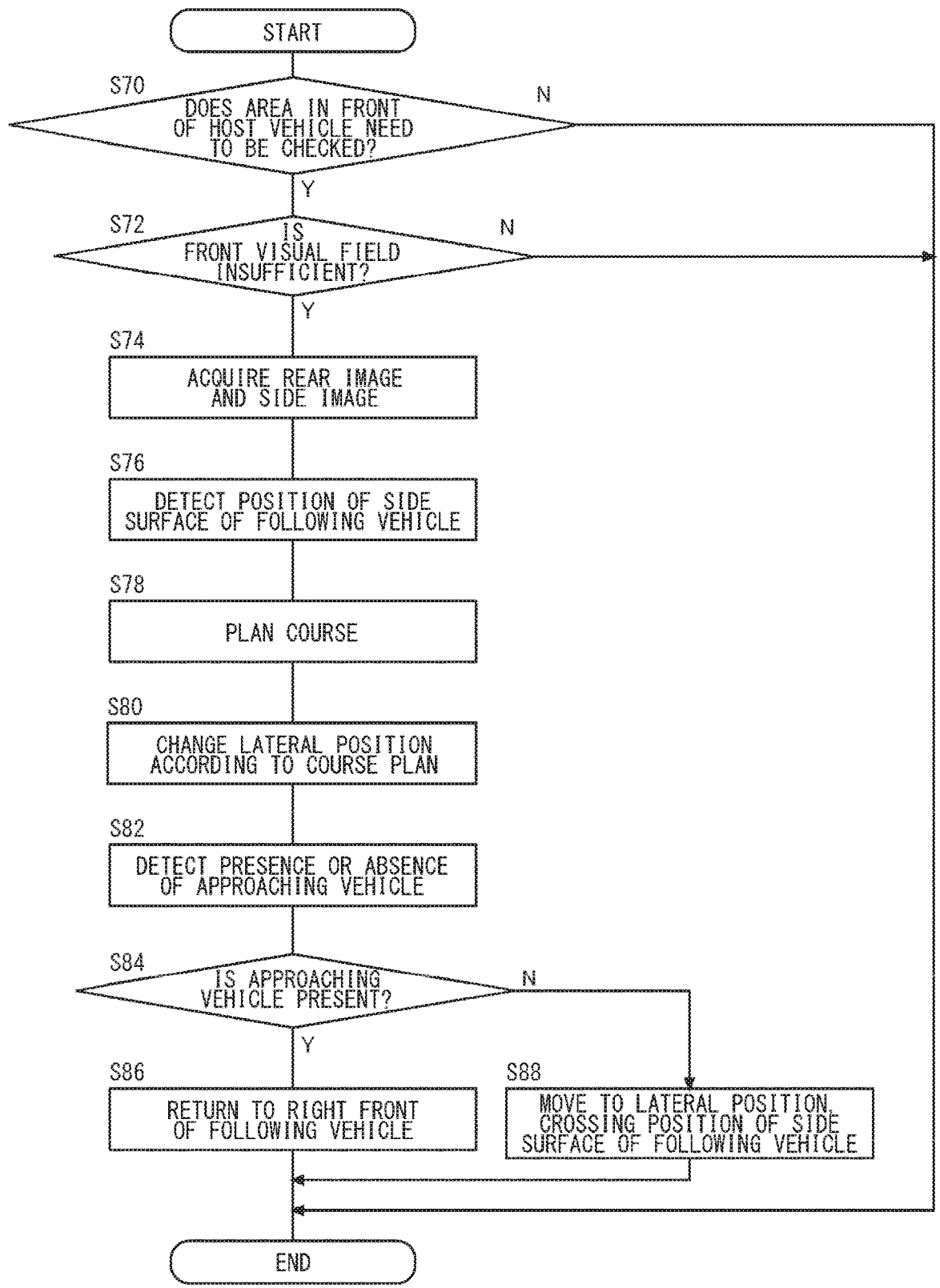
FIG. 15 is a flowchart illustrating an operation of a vehicle control device according to a third embodiment.

FIG. 15 is a flowchart illustrating an operation of the vehicle control device 30 according to the third embodiment. Here, it is assumed that the estimator 42 estimates that an area in front of the host vehicle 102 needs to be checked (Y in S70), and it is detected that front visual field of the host vehicle 102 is less than a threshold vehicle (Y in S72). In addition, here, a situation in which the front visual field of the driver of the host vehicle 102 is blocked by the preceding vehicle 110 when the host vehicle 102 performs a lane change to the right lane from a lane in which the host vehicle 102 currently travels, is assumed. Processing in S74 to S82 is the same as the processing in S54 to S62 in FIG. 12 described in the second embodiment, therefore a description thereof will be omitted. It should be noted that the traveling controller 40 may maintain a state where a lateral position of a side surface of the vehicle body of the host vehicle 102 coincides with a lateral position of a side surface of the vehicle body of the following vehicle 104 for a predetermined time also in the third embodiment.

When an approaching vehicle is detected (Y in S84), the course determiner 38 plans a new course of the host vehicle 102 so that a lateral direction offset of the central portion of the vehicle body of the host vehicle 102 at a target stop position coincides with a lateral direction offset of the central portion of the vehicle body of the following vehicle 104. The traveling controller 40 causes the host vehicle 102 to move to be in right front of the following vehicle 104 according to the new course plan determined by the course determiner 38 (S86).

When an approaching vehicle is not detected (N in S84), the course determiner 38 plans a new course of the host vehicle 102 so that a lateral position of the right side surface of the vehicle body of the host vehicle 102 crosses a lateral position of the right side surface of the vehicle body of the following vehicle 104. In other words, the host vehicle 102 moves to a position at which an area blocked by the preceding vehicle 110 in the front visual field of the driver becomes smaller. The traveling controller 40 causes the host vehicle 102 to move further to the right than the following vehicle 104 according to the new course plan determined by the course determiner 38 (S88). When the front visual field of the host vehicle 102 is the predetermined threshold value or more (N in S72), the processing from S74 is skipped and the flow of processing in FIG. 15 ends. Further, when the estimator 42 estimates that the area in front of the host vehicle 102 need not be checked (N in S70), the processing from S72 is skipped and the flow of processing in FIG. 15 ends.

According to the vehicle control device 30 of the third embodiment, it is possible to decrease the range blocked by the preceding vehicle 110 while reducing the risk of collision with the two-wheeled vehicle or the like approaching from behind, when the area in front of the host vehicle 102 needs to be checked, but the front visual field is blocked by the preceding vehicle 110 or the like.

Hereinabove, the present disclosure has been described based on the third embodiment. The third embodiment is an example, and those skilled in the art will understand that various modifications of a combination of the respective components or the respective processing processes of the third embodiment can be made, and the modifications are also within the scope of the present disclosure.

A first modification of the third embodiment will be described. The host vehicle 102 may not include the side image capturing device 12 (the right image capturing device 12a and the left image capturing device 12b). That is, the host vehicle 102 may not include a means for detecting an object in an area of a lateral-rear side of the host vehicle 102. In this case, when the host vehicle 102 reaches a side surface coinciding position at which the lateral position of the side surface of the host vehicle 102 coincides with that of the following vehicle 104, the course determiner 38 may determine a course of the host vehicle 102 so that the host vehicle 102 continues to move straight. In the first modification, the host vehicle 102 waits until the driver checks an area behind the host vehicle 102 with his/her eyes by using a side mirror 14 or the like, and manually performs an operation such as avoidance or a lane change.

A second modification of the third embodiment will be described. The host vehicle 102 may not include the side image capturing device 12 (the right image capturing device 12a and the left image capturing device 12b). When the host vehicle 102 reaches a side surface coinciding position at which the lateral position of the side surface of the host vehicle 102 coincides with that of the following vehicle 104, the course determiner 38 may continue to move straight for a predetermined time (for example, 3 seconds) When the predetermined time passes without an input of a predetermined operation of canceling a lane change or a right or left turn from the driver, the course determiner 38 may determine a new course of the host vehicle 102 so that the host vehicle 102 moves to a position at which an area blocked by the preceding vehicle becomes smaller. When an approaching vehicle is present, it is considered that the driver will input an operation of avoidance within the predetermined time. Therefore, when the operation of avoidance is not input, the host vehicle 102 may be operated in the same manner as in the case where an approaching vehicle is not present according to the third embodiment.

A third modification of the third embodiment will be described. The processing in S72 illustrated in FIG. 15 may be skipped. That is, when the estimator 42 estimates that an area in front of the host vehicle 102 needs to be checked, the course determiner 38 may determine a course of the host vehicle 102 so that the host vehicle 102 moves to a side surface coinciding position at which the lateral position of the side surface of the host vehicle 102 coincides with that of the following vehicle 104, regardless of whether or not the front visual field of the host vehicle 102 is sufficient.

A fourth modification of the third embodiment will be described. A branching processing of determining whether or not the front visual field is insufficient is performed before the processing in S88 illustrated in FIG. 15, and when the front visual field is insufficient at a point in time at which the host vehicle 102 reaches a side surface coinciding position with respect to the following vehicle 104, the processing in S88 in which the host vehicle 102 moves to a lateral position crossing the side surface coinciding position with respect to the following vehicle 104 may be bypassed. That is, a control of repeatedly performing determination of necessity to change the lateral position even after S70 to thereby minimize a change of the lateral position may be performed.

An arbitrary combination of the embodiment and modifications described above is also useful as one embodiment of the present disclosure. A new embodiment generated by the combination has the effects of both of the embodiment and the modifications which are combined. In addition, those skilled in the art will also understand that the functions which should be performed by respective constituent elements described are implemented by a single constituent element or cooperation of the constituent elements described in the embodiment and the modifications.

The technology described in the embodiment and the modifications may be specified by the following:

A vehicle control device, including:

an receiver structured to receive an image of a periphery of a host vehicle captured by an image capturing device;

a detector structured to detect a lateral position of a following vehicle in the same lane as that in which the host vehicle travels, the following vehicle being reflected in the image received by the receiver and traveling in the lane;

and a decision circuitry structured to determine a lateral position of the host vehicle in the lane depending on the lateral position of the following vehicle detected by the detector.

According to the vehicle control device, it is possible to improve safety of the host vehicle by actively using the following vehicle for shielding.

The decision circuitry further determines a course of the host vehicle so that the lateral position of the host vehicle in the lane coincides with the lateral position of the following vehicle in the lane.

According to the vehicle control device, it is possible to improve safety of the host vehicle by actively using the following vehicle for shielding.

The decision circuitry further determines a course of the host vehicle so that a lateral position of the host vehicle at a target stop position coincides with the lateral position of the following vehicle, and the host vehicle at the target stop position is positioned in parallel to a lane dividing line.

According to the vehicle control device, it is possible to prevent another vehicle from a misunderstanding due to a behavior of the host vehicle and further improve safety of the host vehicle.

The decision circuitry further determines a course of the host vehicle so that the lateral position of the host vehicle at the target stop position coincides with the lateral position of the following vehicle, and an angle between the host vehicle and the lane dividing line does not exceed a predetermined value during movement to the target stop position.

According to the vehicle control device, it is possible to prevent another vehicle from a misunderstanding due to a behavior of the host vehicle and further improve safety of the host vehicle.

When a preceding vehicle or the following vehicle moves, the detector detects the movement of the preceding vehicle or the following vehicle, and when the movement of the preceding vehicle or the following vehicle is detected at the time of moving to the target stop position, the decision circuitry updates the course of the host vehicle depending on a lateral position of the following vehicle at the time of the detection.

According to the vehicle control device, it is possible to determine a course of the host vehicle suitable for the up-to-date state (traveling positions) of other vehicles in front of and behind the host vehicle.

When the following vehicle shows a motion including a course change or a right turn or left turn, or indicates of an intention of a course change or a right turn or left turn, the detector detects the motion of the following vehicle including the course change or the right turn or left turn, or the intention of the course change or the right turn or left turn, and when the motion of the following vehicle including the course change or the right turn or left turn, or the intention of the course change or the right turn or left turn is detected, the decision circuitry stops determining the course of the host vehicle depending on the lateral position of the following vehicle.

According to the vehicle control device, it is possible to suppress the host vehicle from tracking the following vehicle performing a course change or a right or left turn.

When the following vehicle changes the lateral position of the following vehicle, the detector detects the change of the lateral position of the following vehicle, and when the following vehicle changes the lateral position of the following vehicle by more than a predetermined number of times within a predetermined time, the decision circuitry stops determining the course of the host vehicle depending on the lateral position of the following vehicle.

The operation of the following vehicle can also be regarded as an operation that causes a driver of the following vehicle to feel an antipathy for being obstructed by the host vehicle. Therefore, in this case, it is possible to further improve safety of the host vehicle by canceling the tracking of the lateral position of the following vehicle.

The vehicle control device further includes:
an estimator structured to estimate whether or not an area behind the host vehicle needs to be checked based on an operation by a driver with respect to the host vehicle or a planned traveling route of the host vehicle,
wherein when the estimator estimates that the area behind the host vehicle needs to be checked, the decision circuitry determines a course of the host vehicle so that the host vehicle moves to a position at which a position of a side surface of the host vehicle coincides with a position of a side surface of the following vehicle.

According to the vehicle control device, it is possible to reduce a risk of coming into contact with another vehicle (two-wheeled vehicle or the like) traveling behind the following vehicle at the time of movement for checking the area behind the host vehicle.

When a rear visual field of the host vehicle is small due to blocking by the following vehicle, the detector detects that the rear visual field of the host vehicle is small based on the image received by the receiver or data obtained by a predetermined sensor, and when it is detected that the rear visual field of the host vehicle is small, the decision circuitry determines a course of the host vehicle so that the host vehicle moves to the position at which the position of the side surface of the host vehicle coincides with the position of the side surface of the following vehicle.

According to the vehicle control device, it is possible to reduce a risk of coming into contact with another vehicle (two-wheeled vehicle or the like) traveling behind the following vehicle at the time of movement for checking the area behind the host vehicle.

The decision circuitry further determines a course of the host vehicle so that the host vehicle maintains the position at which the position of the side surface of the host vehicle coincides with the position of the side surface of the following vehicle until a predetermined time passes from a time when the position of the side surface of the host vehicle coincides with the position of the side surface of the following vehicle.

According to the vehicle control device, it is possible to improve accuracy of detection of another vehicle (two-wheeled vehicle or the like) traveling behind the following vehicle.

The detector further detects a presence or absence of another vehicle approaching the host vehicle at the position at which the position of the side surface of the host vehicle coincides with the position of the side surface of the following vehicle, and when the other vehicle approaching the host vehicle is detected at the position at which the position of the side surface of the host vehicle coincides with the position of the side surface of the following vehicle, the decision circuitry determines a course of the host vehicle so that a lateral position of a central portion of the host vehicle in the lane coincides with a lateral position of a central portion of the following vehicle in the lane.

According to the vehicle control device, it is possible to further reduce a risk of coming into contact with another vehicle (two-wheeled vehicle or the like) traveling behind the following vehicle.

When the other vehicle approaching the host vehicle is not detected at the position at which the position of the side surface of the host vehicle coincides with the position of the side surface of the following vehicle, the decision circuitry determines a course of the host vehicle so that the host vehicle moves to a position at which an area blocked by the following vehicle further becomes smaller.

According to the vehicle control device, it is possible to expand a rear visual field of the host vehicle when another vehicle (two-wheeled vehicle or the like) traveling behind the following vehicle is not present.

When a front visual field of the host vehicle is small due to blocking by the preceding vehicle, the detector detects that the front visual field of the host vehicle is small based on the image received by the receiver or data obtained by a predetermined sensor, when it is detected that the front visual field of the host vehicle is small, the decision circuitry determines a course of the host vehicle so that the host vehicle moves to a position at which a position of a side surface of the host vehicle coincides with a position of a side surface of the following vehicle, and when a predetermined time passes from a time when the host vehicle reaches the position at which the position of the side surface of the host vehicle coincides with the position of the side surface of the following vehicle, the decision circuitry determines a course of the host vehicle so that the host vehicle moves to a position at which an area blocked by the preceding vehicle further becomes smaller.

According to the vehicle control device, it is possible to improve safety of the host vehicle and secure a front visual field.

The vehicle control device further includes:
an estimator structured to estimate whether or not an area in front of the host vehicle needs to be checked based on an operation by a driver with respect to the host vehicle,
wherein when the estimator estimates that the area in front of the host vehicle needs to be checked, the decision circuitry determines a course of the host vehicle so that the host vehicle moves to a position at which a position of a side surface of the host vehicle coincides with a position of a side surface of the following vehicle.

According to the vehicle control device, it is possible to support checking of an area in front of the host vehicle without damaging safety of the host vehicle.

The vehicle control device further includes a traveling controller structured to control traveling of the host vehicle so that the host vehicle moves to the position determined by the decision circuitry.

According to the vehicle control device, it is possible to implement a suitable automatic driving.

A computer program causing a computer to execute the following processes of:

receiving an image of a periphery of a host vehicle captured by an image capturing device;

detecting a lateral position of a following vehicle in the same lane as that in which the host vehicle travels, the following vehicle being reflected in the received image and traveling in the lane; and determining a lateral position of the host vehicle in the lane depending on the detected lateral position of the following vehicle.

According to the computer program, it is possible to improve safety of the host vehicle by actively using the following vehicle for shielding.

What is claimed is:

1. A vehicle control device, comprising:
    a receiver structured to receive an image of a periphery of a host vehicle captured by an image capturing device;
    a detector structured to detect a lateral position of a following vehicle in the same lane as that in which the host vehicle travels, the following vehicle being reflected in the image received by the receiver and traveling in the lane; and
    a decision circuitry structured to determine a lateral position, which indicates a distance from a lane dividing line to a central portion of a vehicle body, the lane dividing line being a centerline or outer edge line of the lane, of the host vehicle in the lane depending on the lateral position of the following vehicle detected by the detector,
    wherein
    when the following vehicle changes the lateral position, which indicates the distance from the lane dividing line to the central portion of the vehicle body of the following vehicle, by a distance amount less than a predetermined threshold value, the decision circuitry determines a course of the host vehicle including a target stop position so that the lateral position of the host vehicle in the lane coincides with the lateral position of the following vehicle in the lane,
    when the following vehicle changes the lateral position, which indicates the distance from the lane dividing line to the central portion of the vehicle body of the following vehicle, by a distance amount exceeding the predetermined threshold value, the decision circuitry stops determining the course of the host vehicle so that the lateral position of the host vehicle in the lane does not coincide with the lateral position of the following vehicle in the lane, and
    an angle between the host vehicle and the lane dividing line does not exceed a predetermined value during a movement to the target stop position.

2. The vehicle control device according to claim 1, wherein the host vehicle at the target stop position is positioned in parallel to the lane dividing line.

3. The vehicle control device according to claim 1, wherein when a preceding vehicle or the following vehicle moves, the detector detects a movement of the preceding vehicle or the following vehicle, and
    when the movement of the preceding vehicle or the following vehicle is detected at the time of moving to the target stop position, the decision circuitry updates the course of the host vehicle depending on a lateral position of the following vehicle at the time of the detection.

4. The vehicle control device according to claim 1, wherein, when the following vehicle shows a motion including a course change or a right turn or left turn, or indicates an intention of the course change or the right turn or left turn, the detector detects the motion of the following vehicle including the course change or the right turn or left turn, or the intention of the course change or the right turn or left turn, and
    when the motion of the following vehicle including the course change or the right turn or left turn, or the intention of the course change or the right turn or left turn is detected, the decision circuitry stops determining the course of the host vehicle depending on the lateral position of the following vehicle.

5. The vehicle control device according to claim 1, wherein, when the following vehicle changes the lateral position of the following vehicle, the detector detects the change of the lateral position of the following vehicle, and
    when the following vehicle changes the lateral position of the following vehicle by more than a predetermined number of times within a predetermined time, the decision circuitry stops determining the course of the host vehicle depending on the lateral position of the following vehicle.

6. The vehicle control device according to claim 1, further comprising:
    an estimator structured to estimate whether or not an area behind the host vehicle needs to be checked based on an operation by a driver with respect to the host vehicle or a planned traveling route of the host vehicle,
    wherein when the estimator estimates that the area behind the host vehicle needs to be checked, the decision circuitry determines a course of the host vehicle so that the host vehicle moves to a position at which a position of a side surface of the host vehicle coincides with a position of a side surface of the following vehicle.

7. The vehicle control device according to claim 1, wherein, when a rear visual field of the host vehicle is smaller than a predetermined threshold value due to blocking by the following vehicle, the detector detects that the rear visual field of the host vehicle is smaller than the predetermined threshold value based on the image received by the receiver or data obtained by a predetermined sensor, and
    when it is detected that the rear visual field of the host vehicle is smaller than the predetermined threshold value, the decision circuitry determines a course of the host vehicle so that the host vehicle moves to a position at which a position of a side surface of the host vehicle coincides with a position of a side surface of the following vehicle.

8. The vehicle control device according to claim 6, wherein the decision circuitry determines a course of the host vehicle so that the host vehicle maintains the position at which the position of the side surface of the host vehicle coincides with the position of the side surface of the following vehicle until a predetermined time passes from at a time when the position of the side surface of the host vehicle coincides with the position of the side surface of the following vehicle.

9. The vehicle control device according to claim 6, wherein the detector detects a presence or absence of another vehicle approaching the host vehicle at the position at which the position of the side surface of the host vehicle coincides with the position of the side surface of the following vehicle, and when the other vehicle approaching the host vehicle is detected at the position at which the position of the side surface of the host vehicle coincides with the position of the side surface of the following vehicle, the decision circuitry determines a course of the host vehicle so that a lateral position of the central portion of the host vehicle in the lane coincides with a lateral position of a central portion of the following vehicle in the lane.

10. The vehicle control device according to claim 9, wherein, when the other vehicle approaching the host vehicle is not detected at the position at which the position of the side surface of the host vehicle coincides with the position of the side surface of the following vehicle, the decision circuitry determines a course of the host vehicle so that the host vehicle moves to a target position at which an area blocked by the following vehicle further becomes smaller than prior to the moving of the host vehicle to the target position.

11. The vehicle control device according to claim 1, wherein, when a front visual field of the host vehicle is smaller than a predetermined threshold value due to blocking by a preceding vehicle, the detector detects that the front visual field of the host vehicle is smaller than the predetermined threshold value based on the image received by the receiver or data obtained by a predetermined sensor, when it is detected that the front visual field of the host vehicle is smaller than the predetermined threshold value, the decision circuitry determines a course of the host vehicle so that the host vehicle moves to a position at which a position of a side surface of the host vehicle coincides with a position of a side surface of the following vehicle, and when a predetermined time passes from at a time when the host vehicle reaches the position at which the position of the side surface of the host vehicle coincides with the position of the side surface of the following vehicle, the decision circuitry determines a course of the host vehicle so that the host vehicle moves to a target position at which an area blocked by the preceding vehicle further becomes smaller than prior to the moving of the host vehicle to the target position.

12. The vehicle control device according to claim 1, further comprising:

an estimator structured to estimate whether or not an area in front of the host vehicle needs to be checked based on an operation by a driver with respect to the host vehicle, wherein when the estimator estimates that the area in front of the host vehicle needs to be checked, the decision circuitry determines a course of the host vehicle so that the host vehicle moves to a position at which a position of a side surface of the host vehicle coincides with a position of a side surface of the following vehicle.

13. The vehicle control device according to claim 1, further comprising a traveling controller structured to control traveling of the host vehicle so that the host vehicle moves to the position determined by the decision circuitry.

14. A non-transitory recording medium storing a computer program causing a computer to execute the following processes of:

receiving an image of a periphery of a host vehicle captured by an image capturing device;

detecting a lateral position of a following vehicle in the same lane as that in which the host vehicle travels, the following vehicle being reflected in the received image and traveling in the lane;

determining a lateral position, which indicates a distance from a lane dividing line to a central portion of a vehicle body, the lane dividing line being a centerline or outer edge line of the lane, of the host vehicle in the lane depending on the detected lateral position of the following vehicle;

when the following vehicle changes the lateral position, which indicates the distance from the lane dividing line to the central portion of the vehicle body of the following vehicle, by a distance amount less than a predetermined threshold value, determining a course of the host vehicle including a target stop position so that the lateral position of the host vehicle in the lane coincides with the lateral position of the following vehicle in the lane; and when the following vehicle changes the lateral position, which indicates the distance from the lane dividing line to the central portion of the vehicle body of the following vehicle, by a distance amount exceeding the predetermined threshold value, stopping determination of the course of the host vehicle so that the lateral position of the host vehicle in the lane does not coincide with the lateral position of the following vehicle in the lane, wherein an angle between the host vehicle and the lane dividing line does not exceed a predetermined value during a movement to the target stop position.

15. The vehicle control device according to claim 1, wherein the course of the host vehicle includes a lateral movement within the lane being traveled by the host vehicle.

16. The vehicle control device according to claim 1, wherein the course of the host vehicle includes a lateral movement but that keeps the host vehicle within the lane being traveled by the host vehicle.

17. The vehicle control device according to claim 1, wherein the course of the host vehicle includes a lateral movement within two lines on a road defining the lane being traveled by the host vehicle.

\* \* \* \* \*